INVENTOR
GLENN E. STILWELL
BY
ATTORNEY

INVENTOR
GLENN E. STILWELL
BY
ATTORNEY

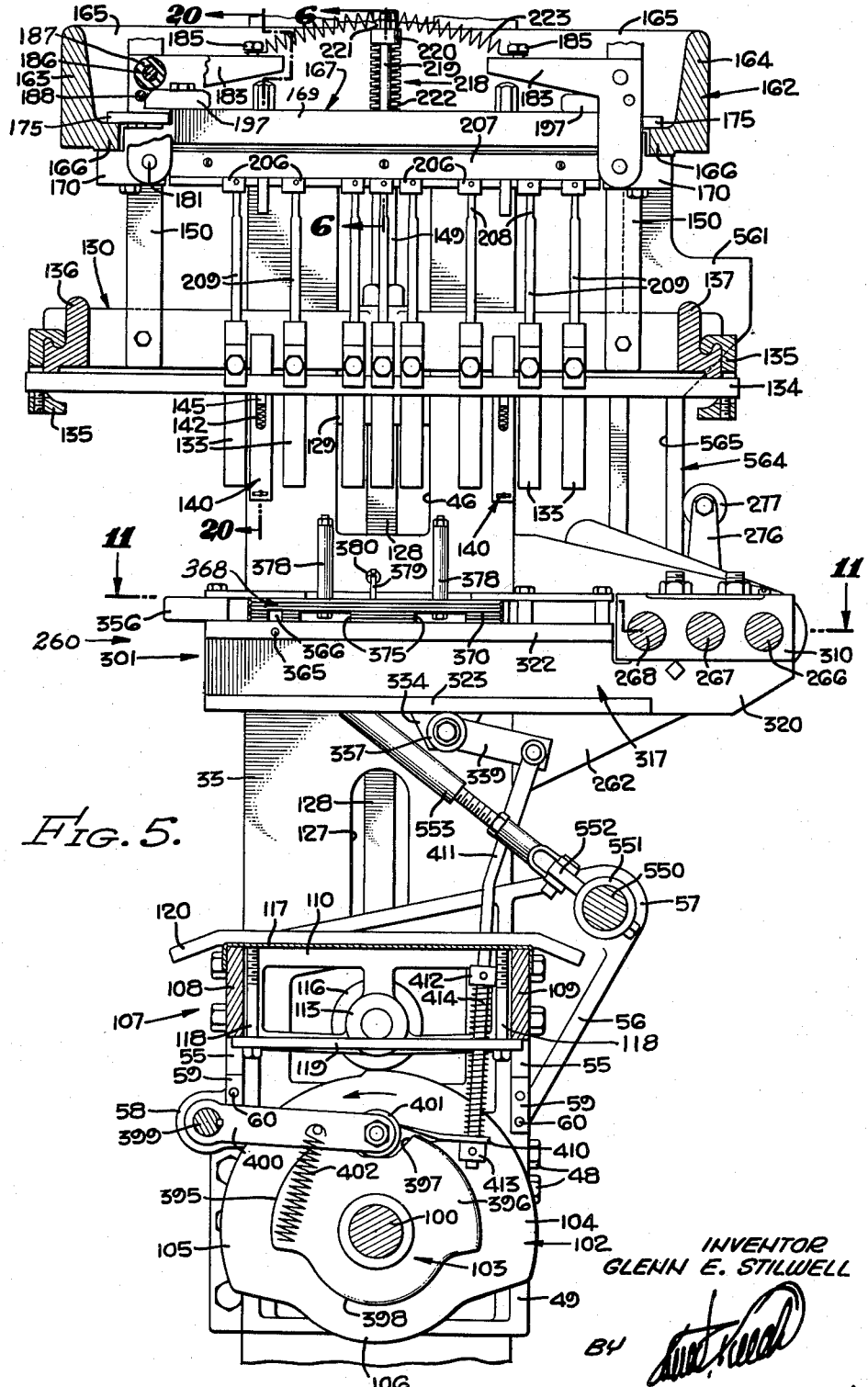

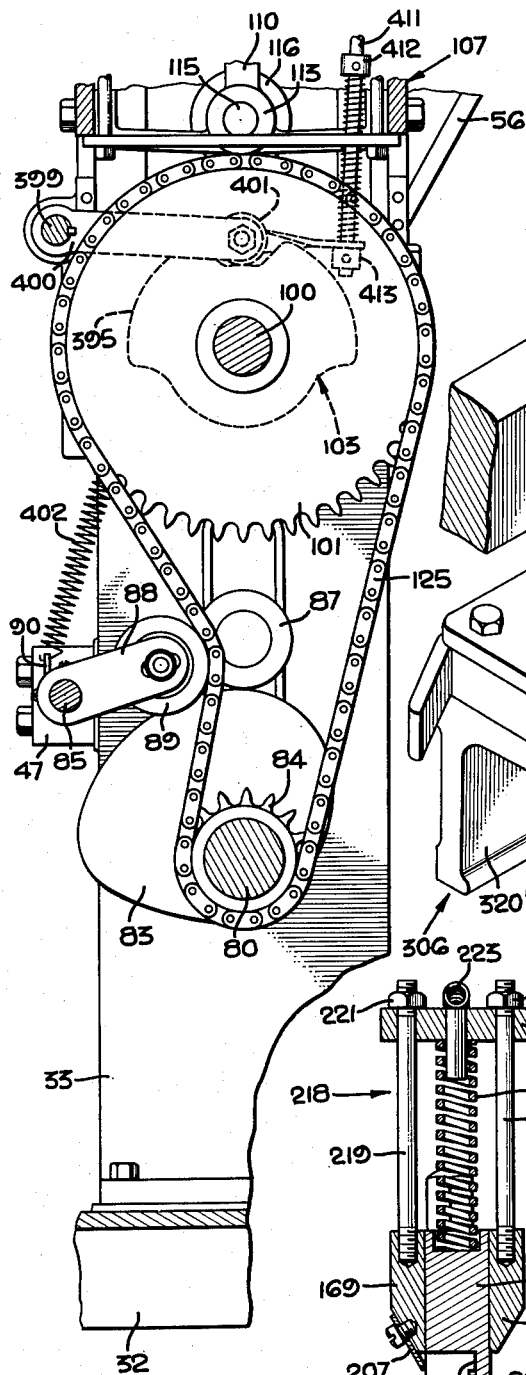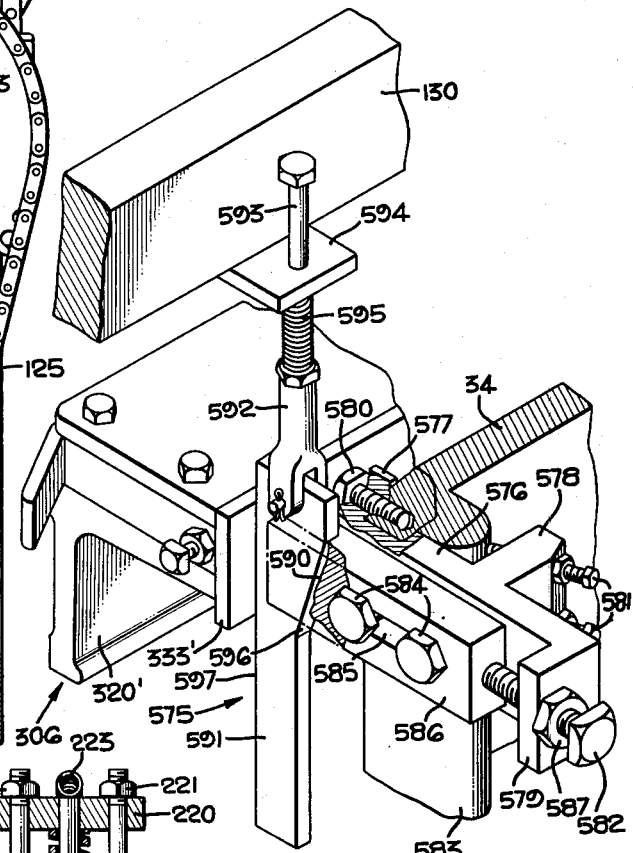

April 21, 1953 G. E. STILWELL 2,635,236
EGG CASE MAKING MACHINE
Filed March 2, 1951 15 Sheets-Sheet 6
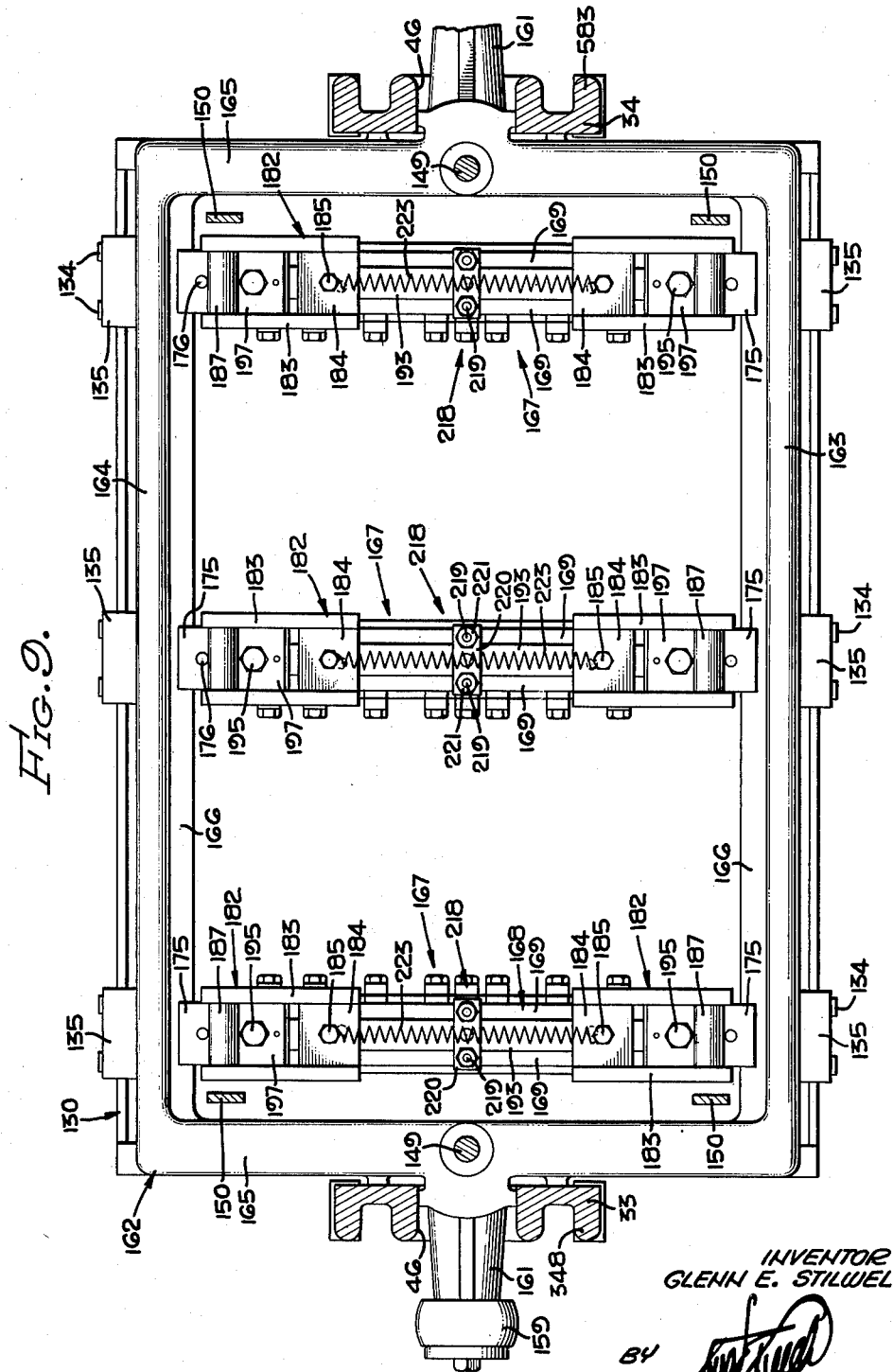
INVENTOR
GLENN E. STILWELL
BY
ATTORNEY April 21, 1953  G. E. STILWELL  2,635,236
EGG CASE MAKING MACHINE
Filed March 2, 1951  15 Sheets-Sheet 7

INVENTOR
GLENN E. STILWELL
BY
ATTORNEY

April 21, 1953  G. E. STILWELL  2,635,236
EGG CASE MAKING MACHINE
Filed March 2, 1951  15 Sheets-Sheet 8

INVENTOR
GLENN E. STILWELL
BY
ATTORNEY

April 21, 1953
G. E. STILWELL
2,635,236
EGG CASE MAKING MACHINE
Filed March 2, 1951
15 Sheets-Sheet 10
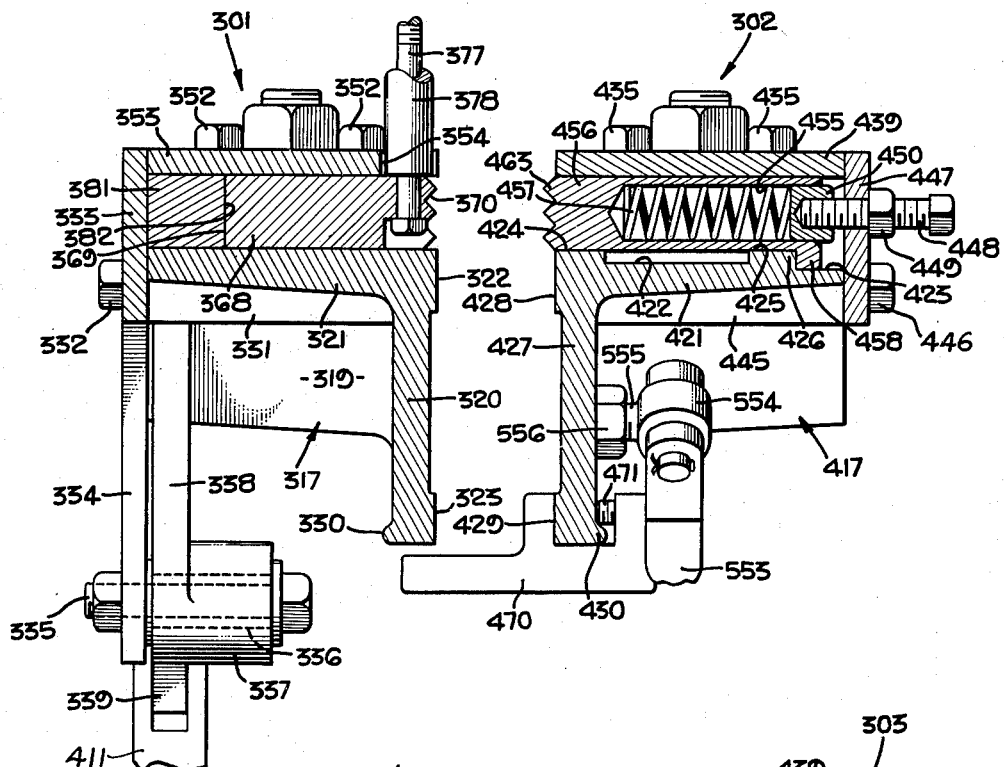
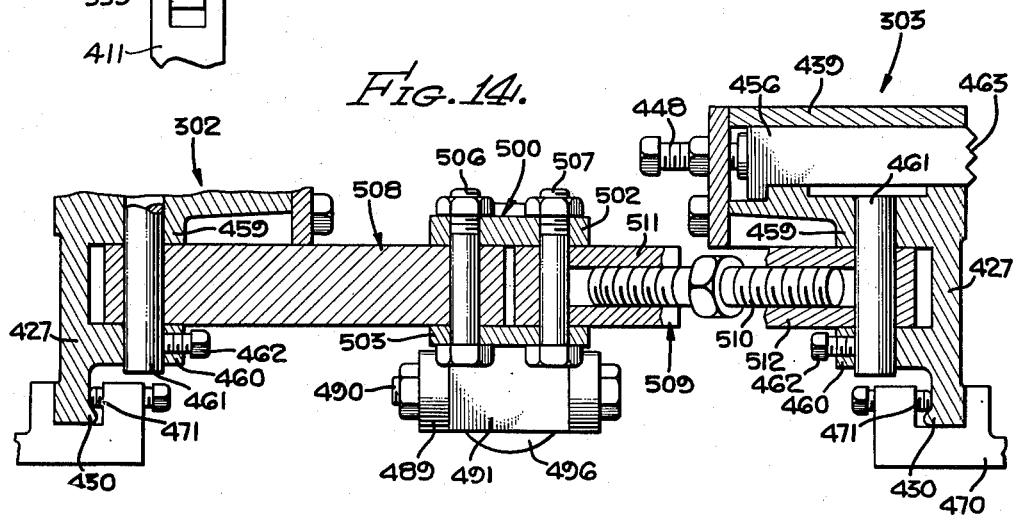
INVENTOR
GLENN E. STILWELL
BY
ATTORNEY April 21, 1953
G. E. STILWELL
2,635,236
EGG CASE MAKING MACHINE
Filed March 2, 1951
15 Sheets-Sheet 11
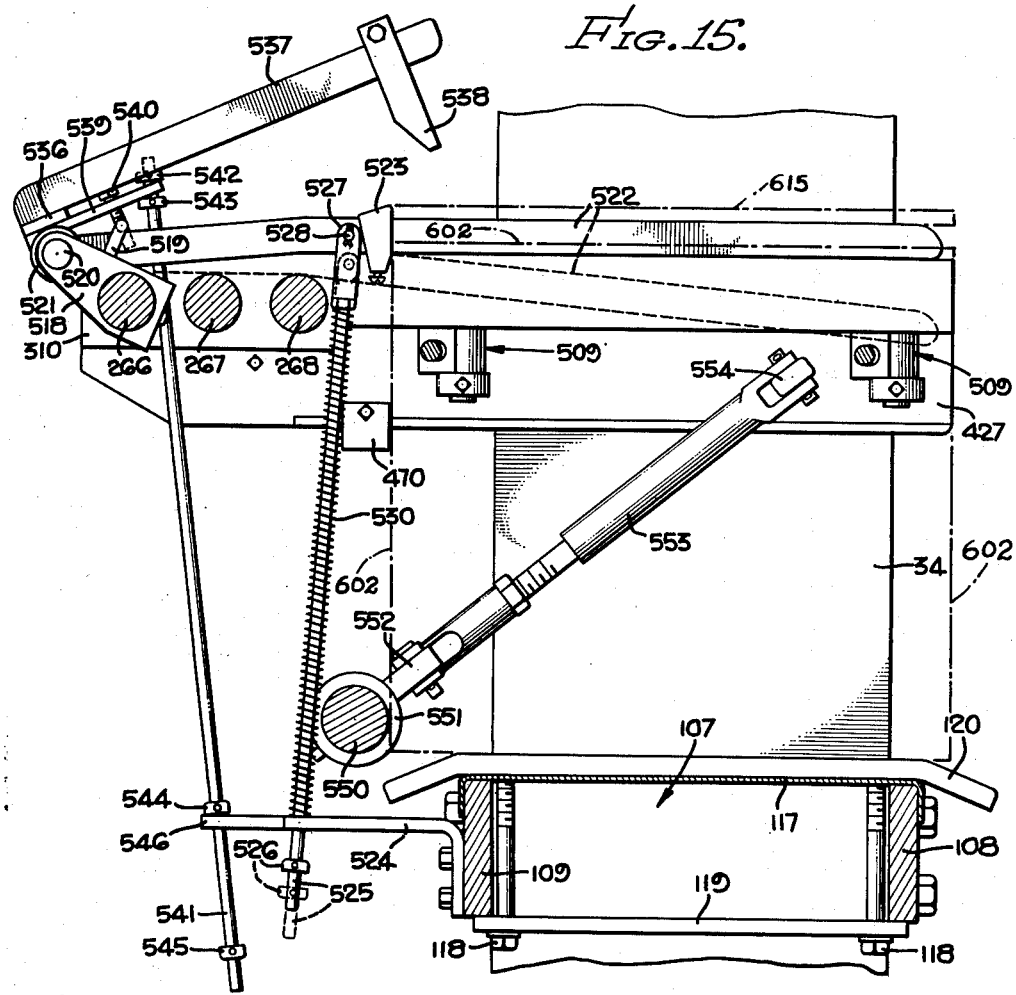
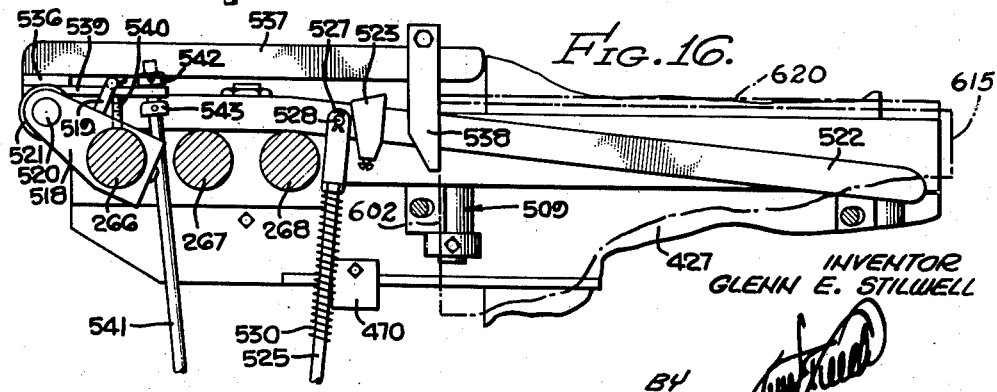
INVENTOR
GLENN E. STILWELL
BY
ATTORNEY April 21, 1953

G. E. STILWELL 2,635,236

EGG CASE MAKING MACHINE

Filed March 2, 1951

INVENTOR
GLENN E. STILWELL

BY

ATTORNEY

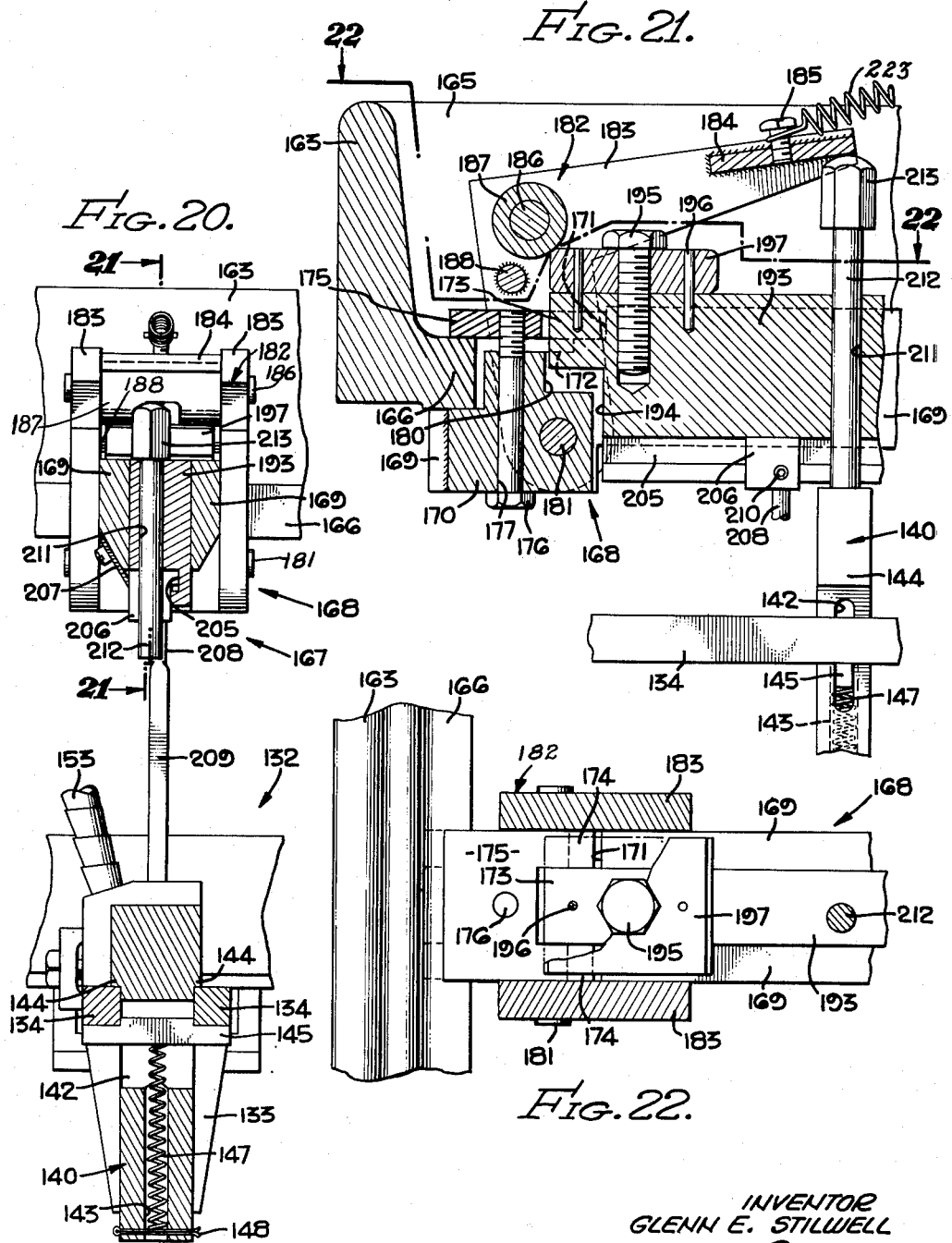

April 21, 1953      G. E. STILWELL      2,635,236
EGG CASE MAKING MACHINE
Filed March 2, 1951      15 Sheets-Sheet 14
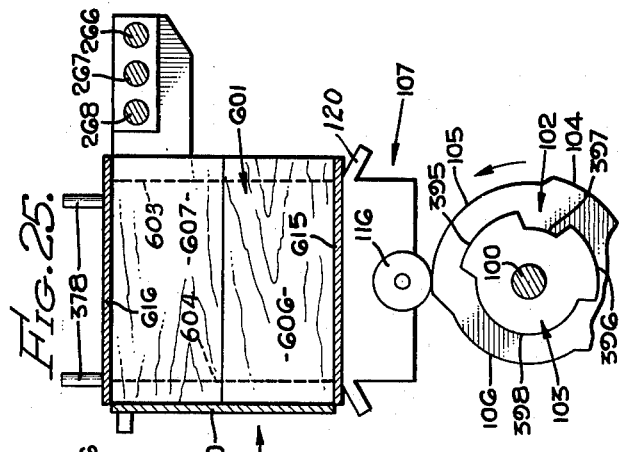
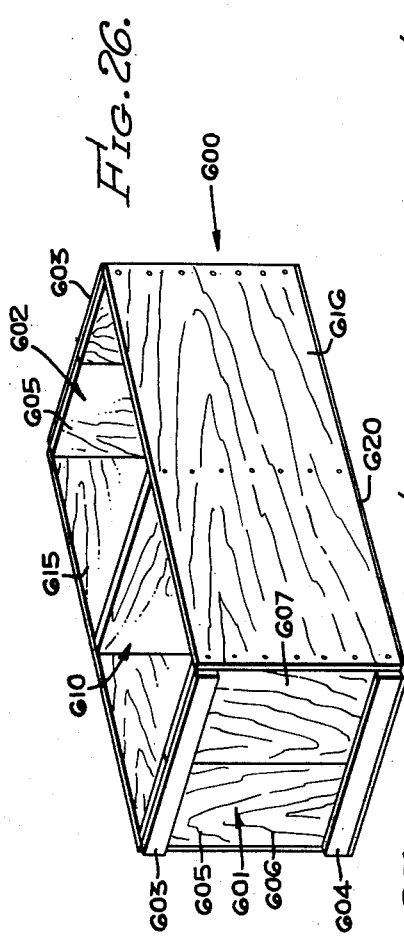
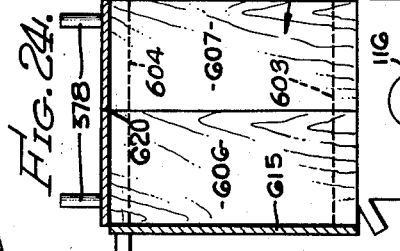
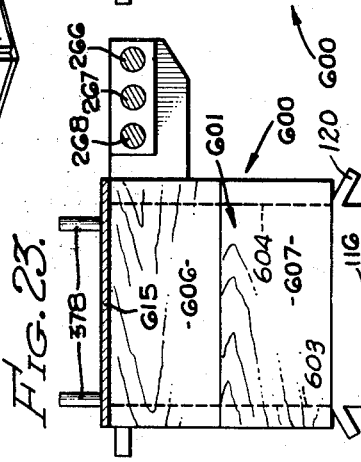
INVENTOR
GLENN E. STILWELL
BY
ATTORNEY April 21, 1953

G. E. STILWELL 2,635,236

EGG CASE MAKING MACHINE

Filed March 2, 1951

INVENTOR
GLENN E. STILWELL
BY
ATTORNEY

Patented Apr. 21, 1953

2,635,236

UNITED STATES PATENT OFFICE 2,635,236

EGG CASE MAKING MACHINE

Glenn E. Stilwell, Riverside, Calif., assignor to Food Machinery and Chemical Corporation, San Jose, Calif., a corporation of Delaware Application March 2, 1951, Serial No. 213,619

20 Claims. (Cl. 1—10)

This invention relates to machines for manufacturing nailed boxes and has particular utility in the manufacture of such boxes from box heads, sides and bottoms which are warped.

Heretofore it has not been possible to use box parts, commonly known as "shook," for the machine manufacture of nailed boxes unless this shook was fairly free from warpage. Certain types of shook which are given to such warpage have been preferred for the construction of nailed boxes for certain uses and it has therefore been necessary to make these boxes by hand.

It is an object of this invention to provide a nailing machine for making nailed boxes which is adapted to employ shook characterized by a degree of warpage heretofore preventing the use of such shook in a nailing machine.

It is another object of the invention to provide a nailing machine for handling shook of this type which will straighten said shook and clamp the same in the true relation the parts have in the finished box, and do this automatically just prior to the driving of the nails in each nailing cycle.

A further object is to provide a machine driving a multiple row of nails at once in which the nails are driven flush with the general level of the work in the plane of said row.

A still further object is to provide a nailing machine capable of making boxes certain edges of the end heads of which have outside cleats and certain other edges have not.

The manner of accomplishing the foregoing objects as well as further objects and advantages will be made manifest in the following description taken in connection with the accompanying drawings in which:

Fig. 5 is an enlarged vertical sectional view taken on the line 5—5 of Fig. 1 and illustrating the cam mechanism for operating the shiftable extensions provided on the outermost box head clamp arms of the invention.

Fig. 6 is an enlarged detailed vertical sectional view taken on the line 6—6 of Fig. 5 and illustrates the rebound spring on one of the nail driver bridge frames.

Fig. 7 is an enlarged fragmentary vertical sectional view taken on the line 7—7 of Fig. 1.

Fig. 8 is a fragmentary perspective view of an automatic clamp arm locking cam of the invention, portions of the structure being broken away for illustrative purposes.

Fig. 9 is an enlarged horizontal sectional view taken on the line 9—9 of Fig. 1 and illustrating, in plan, the automatic nail driver bridge release mechanism of the invention.

Fig. 13 is an enlarged fragmentary vertical sectional detailed view taken on the line 13—13 of Fig. 10 and illustrating the internal construction of the two clamp arms, shown in Fig. 11.

Fig. 14 is a diagrammatic enlarged fragmentary sectional view taken on the line 14—14 of Fig. 10.

Fig. 15 is an enlarged fragmentary sectional view taken on the line 15—15 of Fig. 1 and showing the bottom back stops raised to inoperative position, and with the side supports and stops raised into position for locating and supporting a side at the beginning of a side nailing cycle.

Fig. 16 is a view similar to Fig. 15 and shows the side supports and stops lowered to inoperative position and the bottom back stops lowered into position for limiting the backward movement of the bottom when this is placed in the machine before starting the bottom nailing cycle.

Fig. 20 is an enlarged fragmentary vertical sectional detailed view taken on the line 20—20 of Fig. 5 and illustrating the work hold down pad and punch bridge release mechanism.

Fig. 21 is an enlarged fragmentary sectional detailed view taken on the line 21—21 of Fig. 20 and shows a nail driver bridge releasing device in released position and with the downward movement of the driver bridge interrupted with the latter in an elevated position above the structure normally supporting the same.

Fig. 22 is a sectional view taken on the line 22—22 of Fig. 21.

Fig. 23 is a diagrammatic view illustrating the position of the nailing table supporting cam at the beginning of the first side nailing cycle.

Fig. 24 is a view similar to Fig. 23 showing the position of said cam at the beginning of the bottom nailing cycle.

Fig. 25 is a view similar to Fig. 24 and showing the nailing table supporting cam as positioned at the beginning of the second side nailing cycle.

Fig. 26 is a perspective view of an egg case which is the type of box which the illustrated embodiment of the invention is designed to manufacture.

Figure 1:
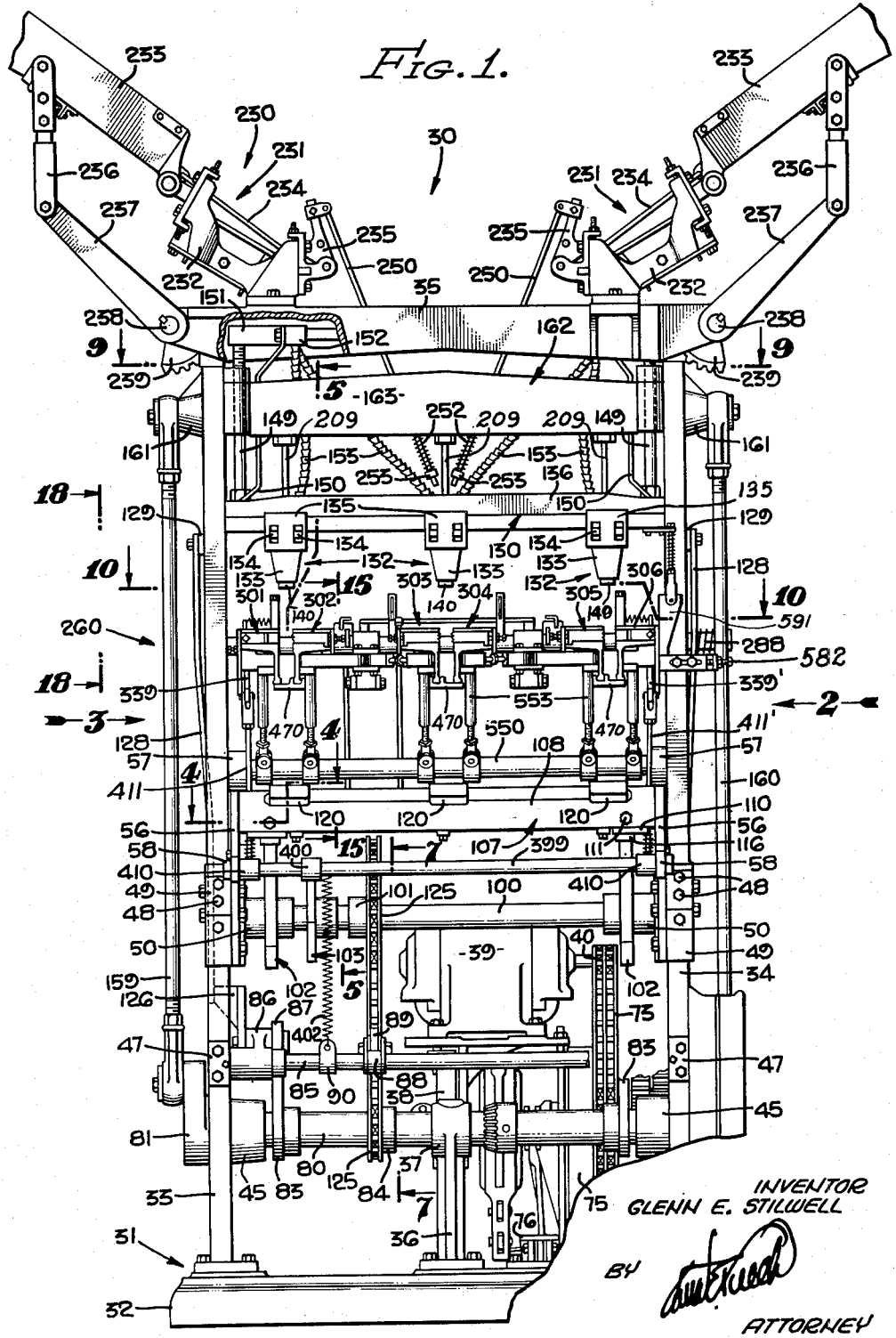
Fig. 1 is a fragmentary front elevational view of a nailing machine incorporating a preferred embodiment of the invention.
Figure 2:
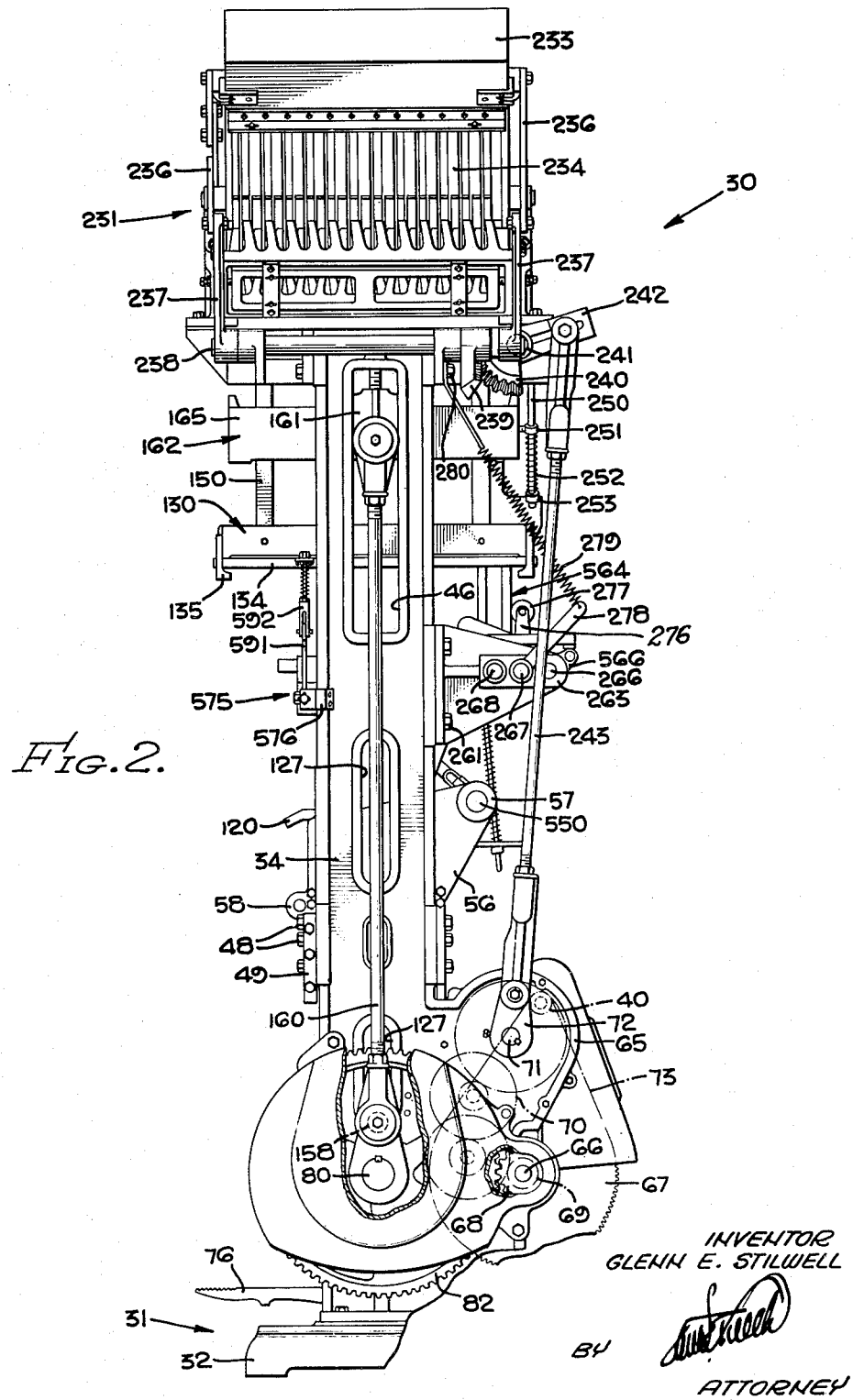
Fig. 2 is a fragmentary side elevational view of the nailing machine in Fig. 1 taken in the direction of the arrow 2.
Figures 3, 4:
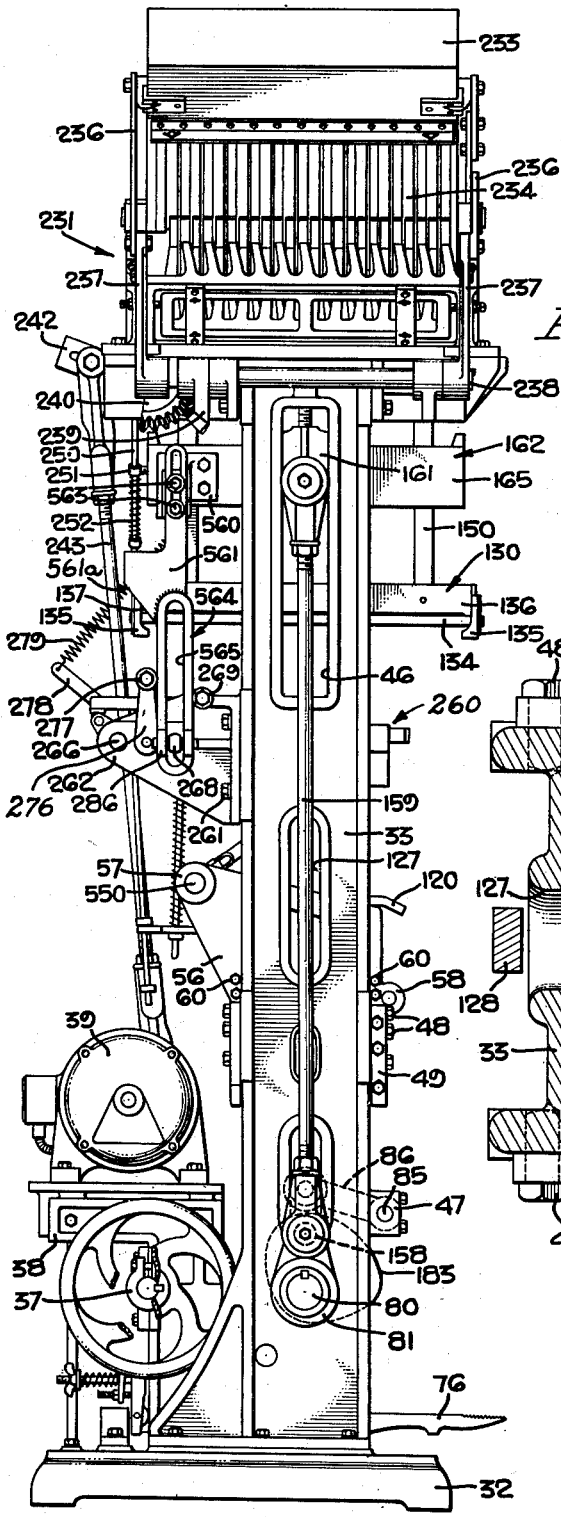
Fig. 3 is a side elevational view of the nailing machine in Fig. 1 taken in the direction of arrow 3.
Fig. 4 is an enlarged fragmentary detailed horizontal sectional view taken on the line 4—4 of Fig. 1 and illustrating the manner of mounting one of the cam follower rollers which supports the nailing table.

Referring specifically to the drawings, and particularly to Figs. 1, 2, and 3, the invention is here shown as embodied in a semi-automatic nailing machine 30, having a main frame 31, including a base 32, and side standards 33 and 34, the standards being connected at their upper ends by a head member 35. The base 32 has a bearing standard 36 carrying a bearing 37. The base 32 also has a motor platform 38 on which is mounted an electric motor 39, having a sprocket pinion 40.

Each of the standards 33 and 34 is provided with a main crank shaft bearing 45 near its lower end, and a vertical slideway 46 near its upper end. Secured to the front edge of the side standards is a bearing 47. Secured for vertical adjustment to each of the side standards 33 and 34 by cap screws 48 is a nailing table mount 49 carrying a nailing table cam shaft bearing 50.

Each of the nailing table mounts 49 has vertical slideways 55 (Fig. 5) formed along opposite edges therein, and a bracket 56 extends upwardly and rearwardly therefrom to terminate in a bearing 57. Also provided on each table mount 49 is a small bearing 58 and a pair of table stops 59 which are secured to the support by cap screws 60.

Extending rearwardly from a lower portion of side standard 34 is a gear casing 65 (Fig. 2) which provides bearings for a jack shaft 66 carrying a chain sprocket 67 and a gear pinion 68. Shaft 66 also has a gear pinion 69 which is connected by a gear train 70 housed in gear casing 65 to a shaft 71 carrying a crank 72.

The chain sprocket 67 is connected to the chain pinion 40 by a chain 73 and rotates freely on the shaft 66. The sprocket 67 embodies a clutch 75 (Fig. 1) for connecting this sprocket with shaft 66, said clutch being controlled by a foot pedal 76 mounted on the base 32.

Journaling in bearings 45 (Figs. 1, 2 and 3) is a crank shaft 80 on one end of which is mounted a crank 81 (Figs. 1 and 3) and on the other end a master gear 82 (Fig. 2), the latter meshing with gear pinion 68.

The shaft 80 also has chuck frame shifting cams 83 and a sprocket 84.

Fixed in bearings 47 (Fig. 1) is a shaft 85 rotatively carrying arms 86 (Figs. 2 and 3) having cam follower rollers 87 (Fig. 7) which rest on cams 83. Fixed on shaft 85 is a chain tightener 88, carrying an idle roller 89. Also carried on the shaft 85 is a spring clip 90.

Journaling in bearings 50 (Fig. 1) is a cam shaft 100 (Fig. 7) to which is fixed a sprocket 101, cams 102, and a cam 103. Cams 102 have equal arced segments 104, 105, and 106. (Figs. 5, 23, 24, and 25.)

*Nailing table*

Sliding on the nailing table mounts 49 is a nailing table 107 (Figs. 1, 4 and 5). This table includes front and rear bars 108 and 109 which are held together by two cross members 110 secured thereto by cap screws 111. Each of the members 110 provides bearings 112 and 113 for trunnions 114 and 115 of a cam follower roller 116, each of which rollers rides on one of the cams 102.

The table 107 is thus supported by the cams 102, opposite ends of the bars 108 and 109 sliding in the slideways 55, as the table 107 is raised or lowered by rotation of camshaft 100.

The table 107 (Fig. 5) is covered by a sheet metal plate 117 which is secured in place by bolts 118, extending upwardly through clamp bars 119 and into three anvils 120 which lie transversely across the table 107 in the planes of the three heads of the box which the machine 30 is designed to manufacture.

The use of table stops 59 (Fig. 5) in the operation of the machine 30 is optional. These stops are employed to support the table 107 in its lowermost position when making a box requiring the lowermost position for the table 107, to be above the lowermost position which this table would have when the rollers 116 ride on the segments 106 of cams 102.

Trained about the sprockets 84 and 101 and the idle roller 89 (Fig. 7) is a chain 125 through which the shaft 100 is driven at a one to three ratio by the shaft 80.

*Chuck frame*

Pivotally connected to the arms 86 (Fig. 1) are link heads 126 which extend outwardly through holes 127 (Figs. 2 and 3) in the side standards 33 and 34 and are rigidly connected to the lower ends of links 128, the upper ends of which connect with bosses 129 which extend outwardly through the openings of slideways 46 from a rectangular cast iron chuck frame 130. The bosses 129 slide in the slideway 46 thereby keeping frame 130 aligned during its vertical movement in the operation of the machine.

The chuck frame 130 carries three banks 132 of nail chucks 133 (Fig. 1) which are supported on bars 134, the opposite ends of which are secured by clamps 135 to the front and rear members 136 and 137 of the chuck frame 130. Mounted between adjacent chucks 133, near the opposite ends of each of the banks 132, are pressure pads 140 (Figs. 20 and 21) each of which comprises a block of metal approximately the same width as the chucks, having a slot 142 with which a bore 143 connects. Shoulders 144 are provided just above the slot 142, the pad 140 slidably fitting between the bars 134 so that said shoulders engage said bars. A notched key 145 extends through the slot 142 and fits upwardly against and between the bars 134, this key being held in place by a stiff compression spring 147 which is extended upwardly through the bore 143 and retained in place by a cotter 148, a hole for receiving which extends through the lower end of the pad 140.

The structure of the nail chuck 133 is not shown in detail as this is well known in the nailing machine art.

Extending upwardly from opposite ends of the chuck frame 130 are heavy slide shafts 149 (Fig. 1) and straps 150 (Figs. 1, 2, 3, and 5) the upper ends of which support a horizontally disposed frame 151 (Fig. 1) on which nail receiving cups 152 are carried. Connecting each of the cups 152 with one of the nail chucks 133 is a flexible nail conduit 153.

Driver frame

Pivotally connected at their lower ends to pins 158 provided on the crank 81 and on the master gear 82 are pitmans 159 and 160 (Fig. 1). The upper ends of these pitmans connect to slide bosses 161 which extend outwardly from a rectangular driver frame 162 through guide slots 46 (Figs. 2 and 3) in standards 33 and 34. This frame has front and rear members 163 and 164 (Figs. 5 and 9) which are connected by end members 165 on which bosses 161 are formed. End members 165 are apertured vertically to slidably receive slide shafts 149. Driver frame members 163 and 164 have inside lower ledges 166 (Fig. 5) upon which are supported three driver bridge assemblies 167 (Fig. 9) each of which is disposed above and in vertical alignment with a corresponding chuck bank 132 (Fig. 20).

Each assembly 167 includes a driver bridge frame 168 having a pair of side members 169 which are held in parallel spaced relationship by their being welded at their opposite ends to attaching blocks 170 (Fig. 21).

Each block 170 and the adjacent ends of members 169 are cut out so as to extend under the adjacent ledges 166. End portions of the members 169 are further notched as at 171 and 172 to form shoulders 173 against which legs 174 (Fig. 22) of a U-shaped clamp plate 175 rest, as this plate is pulled downwardly by a screw 176 extending up through a hole 177 in block 170 and threadedly received in a tapped hole provided therefor in said clamp plate. Each block 170 also has a notch 180 cut in an upper inner corner thereof.

Mounted on each of the opposite ends of each driver bridge frame 168 on a pin 181 (Fig. 21) extending therethrough is a releasable hold-down device 182. Each device 182 is in the shape of a bell crank and includes side plates 183 lower ends of which receive opposite ends of pin 181 and are held in spaced relation by a plate 184 (Fig. 20) welded between their upper extremities. The plate 184 has a screw 185. Pivotally mounted on a heavy pin 186, supported at its opposite ends on plates 183, is a hold-down roller 187. Disposed between the plates 183 and welded thereto at its opposite ends is a stop pin 188.

Slidable vertically in the space between side members 169 of each driver bridge frame 168 is a driver bridge 193. This bridge has a notch 194 cut from each lower end corner thereof to accommodate itself to the block 170 (Fig. 21). Secured to the upper face of each punch bridge 193 at each end thereof by a cap screw 195, and held against rotation by pins 196, is a stop plate 197, the latter over-lapping end portions of members 169 (Fig. 22) so as to support said driver bridge 193 on said members when the machine 30 is at rest and there is no upper pressure against the driver bridge 193. When this is the case, the releasable hold-down devices 182 are free to rock inwardly about the axes of the pins 181 until the stop pins 188 engage outer ends of plates 197 (Fig. 5). This brings the rollers 187 over the outer ends of plates 197 so as to hold opposite ends of the driver bridge 193 downwardly against the driver bridge frame 168 associated therewith.

Each driver bridge 193 has a re-entrant groove 205 extending lengthwise along its lower edge. This groove slidably receives a plurality of driver head blocks 206 which are held in said groove by a removable plate 207. Each block 206 is apertured to receive the round upper end 208 of a square nail driver 209 which extends slidably downwardly into one of the nail chucks 133. Each driver is held in place in its block 206 by an Allen screw 210. Each of the pads 140 carried by the chuck frame 130 in a chuck bank 132 is located just beneath the inner edge of a plate 184. Located at the corresponding end of the driver bridge assembly 167 immediately thereabove and provided in the driver bridge 193 of said assembly in alignment with said pad 140, is a vertical hole 211 in which a tappet rod 212, having a head 213, slides vertically.

Referring now to Figs. 5, 6, and 9, such driver assembly 167 is provided with a rebound device 218. This includes a pair of threaded studs 219 (Fig. 6) which are provided on members 169 at center points therein and extend upwardly through a tie bar 220 and receive nuts 221 to hold said bar down and confine a heavy short compression spring 222 between said bar and the driver bridge 193 of said assembly. Secured at its opposite ends to screws 185 of the devices 182 at opposite ends of each assembly 167 is a coiled spring 223, the function of which is to return devices 182 to their hold-down positions as shown in Fig. 5.

Nail feed

Mounted on the frame head member 35 is a nailfeed 230 including two units 231 (Fig. 1). Each of these units has a base 232 on which a nail pan 233 is pivoted to deliver nails to nail runs 234 and from these through nail picking devices 235 to cups 152 from which conduits 153 deliver the nails to chucks 133. The pans 233 are swung up and down by links 236 and arms 237 on shafts 238 having gear sectors 239 meshing with similar sectors 240 (Fig. 2) on a shaft 241 which is rocked continuously by an arm 242 thereof which is connected by a rod 243 to the slowly rotating arm 72. (Fig. 2.)

The picking devices 235 are actuated by rods 250 which pass through ears 251 on driver frame 162 (Fig. 2) and carry springs 252 and collars 253 for yieldably transmitting vertical movement of the driver frame to said devices causing them to selectively pick nails and deliver these to certain of the chucks 133 during the concluding portion of each nailing cycle.

Automatic aligning and compressing apparatus

Mounted on the side standards 33 and 34 between the chuck frame 130 and the nailing table 107 is an automatic shook aligning and compressing apparatus 260 (Figs. 1, 10-14). Secured to these standards by cap screws 261 and extending rearwardly therefrom are bearing brackets 262 and 263 (Figs. 2 and 3) having aligned triple bearings 264 and 265 (Fig. 10) for three parallel horizontal shafts 266, 267, and 268. Bracket 262 also provides a mount for an idle cam follower roller 269.

The shaft 266 is secured by screws 275 to bearings 264 and 265; shaft 267 freely rotates in said bearings; and shaft 268 is adapted to slide longitudinally in said bearings. Mounted on shaft 267 (Figs. 3, 5 and 18) adjacent bearing 264 is an arm 276 which carries a cam follower roller 277 which lies in the same plane with the roller 269. Fixed on the freely rotatable shaft 267 is an arm 278 (Fig. 2) to the end of which is attached one end of a contractile spring 279, the opposite end of which is connected by a cap screw 280 to the upper end of side standard 34 (Figs. 2, 3 and 10).

Figure 10:
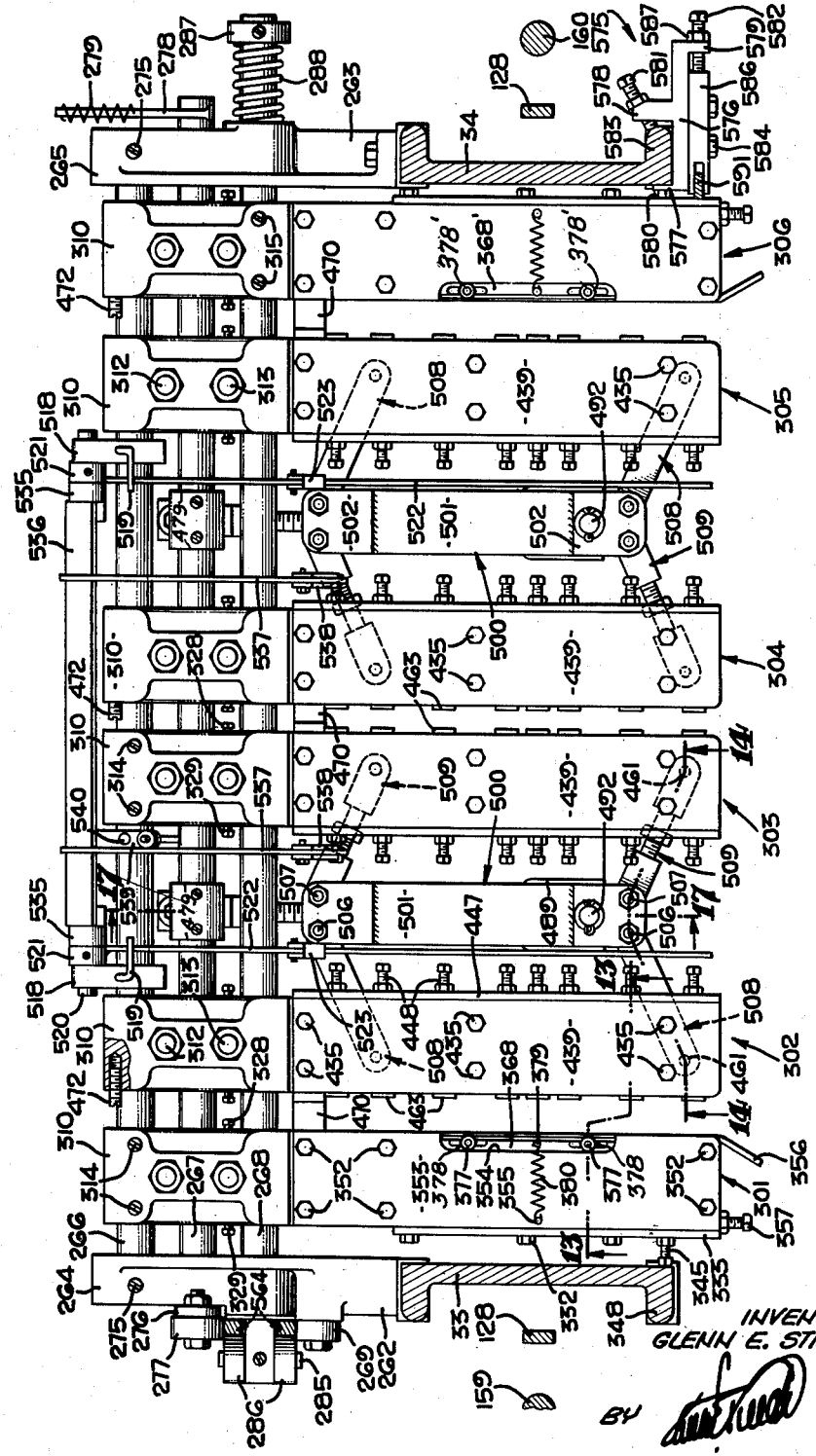
Fig. 10 is an enlarged horizontal sectional view taken on the line 10—10 of Fig. 1 and illustrating the head clamping and side supporting mechanism of the invention.
Figure 18:
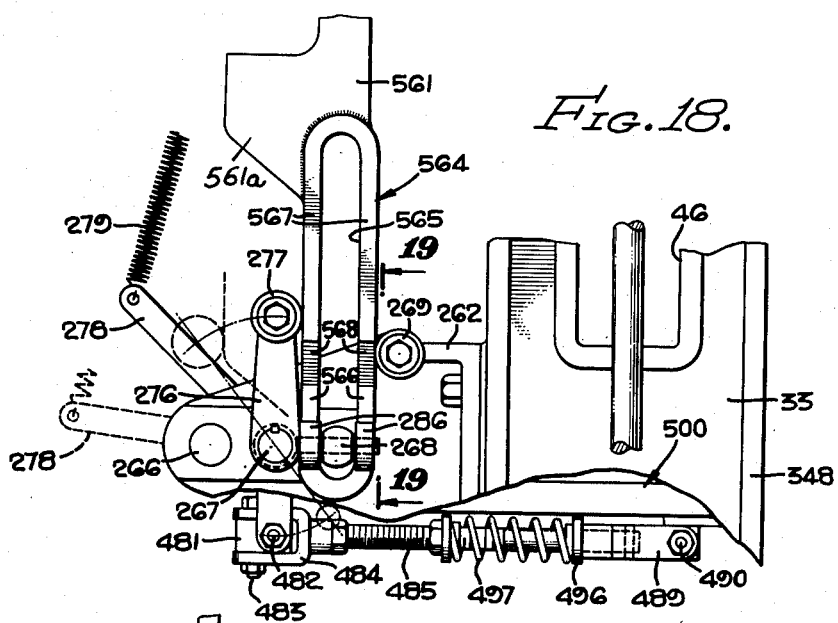
Fig. 18 is an enlarged fragmentary side elevational view of the nailing machine of the invention in the area indicated by line 18—18 of Fig. 1.
Figure 19:
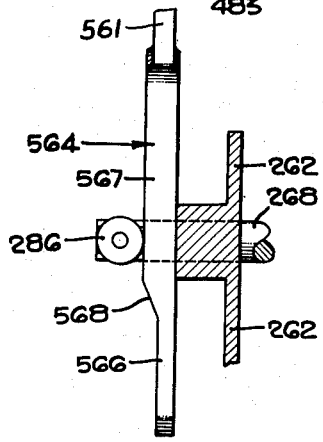
Fig. 19 is a diagrammatic sectional view taken on the line 19—19 of Fig. 18 showing the box length gauging wedge cam during a nailing cycle.
Figure 27:
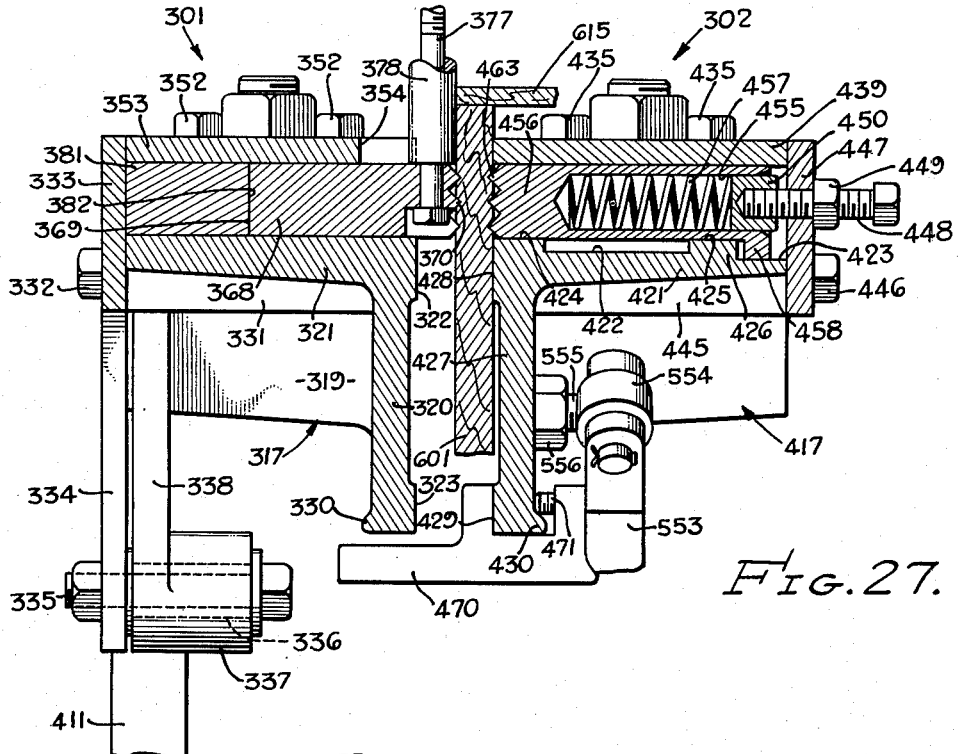
Fig. 27 is a view similar to Fig. 13 in which the clamping means of the invention for clamping one of the heads of the box being made is illustrated with its parts disposed as during the first of three nailing cycles required for the manufacture of a box, this view illustrating the action of the clamping members when no cleat is disposed between these.
Figure 28:
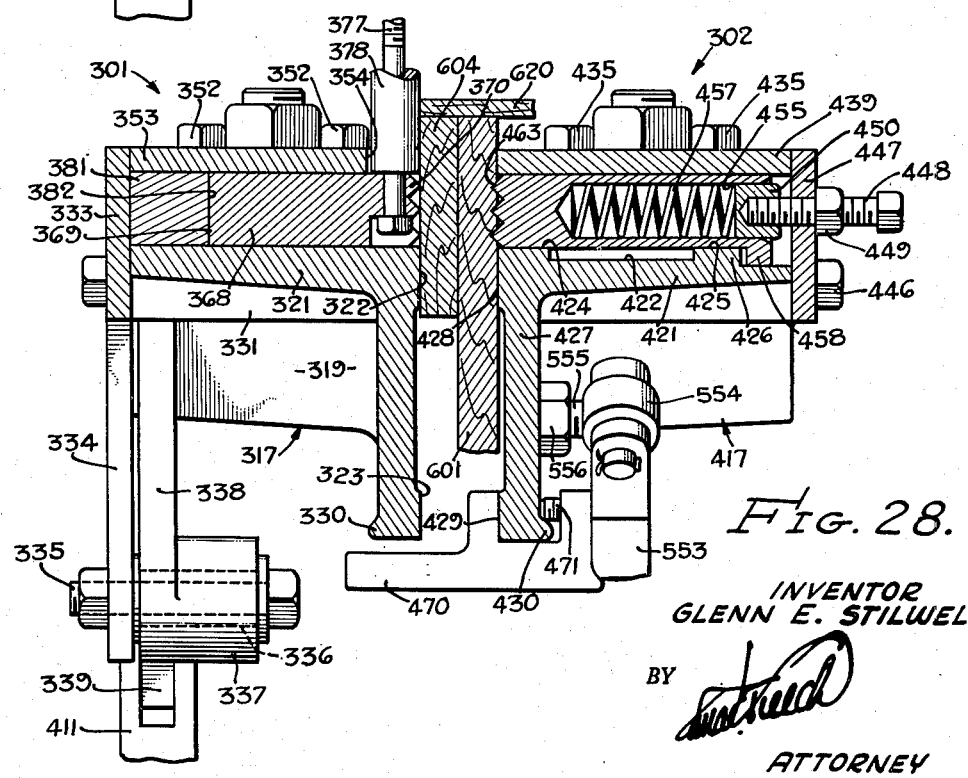
Fig. 28 is a view similar to Fig. 27 illustrating the parts of the clamping means in clamping relation with said head during the second of said three nailing cycles during which a cleat is disposed between the clamping members.

The end of shaft 268 which extends beyond bearing 264 is flattened and apertured to receive a pin 285 on which cam follower rollers 286 are rotatively mounted (Figs. 10 and 18).

The opposite end of shaft 268 (Fig. 10) extends outwardly a substantial distance from bearing 265, and has a collar 287 fixed thereto, a compression spring 288 being trapped between bearing 265 and collar 287.

Mounted on shafts 266, 267, and 268 are clamp arms 301, 302, 303, 304, 305, and 306. Each of the clamp arms aforesaid includes a bearing block 310 (Figs. 10 and 12) which is apertured horizontally to slidably receive the shafts 266, 267, and 268, and is cored out internally to form a grease chamber 311 (Fig. 12) to hold grease for said bearings. Each block 310 is apertured vertically to receive a bolt 312 which passes between shafts 266 and 267 and a bolt 313 which passes between shafts 267 and 268.

Blocks 310 of clamp arms 301 and 303 are provided with set-screws 314 which rigidly secure these blocks to shaft 266.

Block 310 of clamp arm 306 has set-screws 315 which rigidly secure this block to shaft 268.

The principal structural member of each of the clamp arms 301—306 is made up of a cast iron body secured to one of the blocks 310 by its pair of bolts 312 and 313. While much alike, these clamp arm bodies differ in the different clamp arms as will be pointed out in describing these arms.

Clamp arm 301 has a body 317 (Figs. 11 and 12) including a horizontal wall 318 fitting against the bottom of the block 310 and connected by a short vertical wall 319 and a side wall 320 to a higher horizontal floor 321 which extends from block 310 to the front end of the clamp arm. Side wall 320 (Fig. 13) has machined pressure faces 322 and 323 along its upper and lower edges.

The hole in wall 318 for bolt 312 neatly receives this, while the hole for bolt 313 is loose and permits adjustment, by a pair of set screws 328 and 329, threaded into suitable holes in wall 318, and bearing against bolt 313 (Fig. 12), to swing clamp arm body 317 into its proper angular relation with shafts 266, 267, and 268 before it is secured fast to the block 310 by tightening bolts 312 and 313.

Side wall 320 has a bead 330 (Fig. 13) at its inner lower edge and floor 321 is reinforced by bosses 331 for receiving cap screws 332 for securing a back wall plate 333 thereto. Extending downwardly from the plate 333 (Fig. 12) is a bracket 334 to the lower end of which a bolt 335 secures a bearing sleeve 336 on which a bell crank 337 having arms 338 and 339 is pivotally mounted. The upper end of arm 338 has an open slot 340 (Fig. 12), this arm extending upwardly through a notch 341 (Fig. 11) formed in the floor 321.

Disposed just inside the front edge of the frame side standard 33 (Figs. 10 and 11) and on the same horizontal level as the cap screws 332 is a jack screw 345. This screw extends through a hole in side plate 333 and screws into a tapped hole in the floor 321 and has a lock nut 346 for setting this screw with its head 347 just contacting the inner face of side standard 33 in line with a heavy vertical flange 348 formed on said standard along its front edge.

Spaced upwardly from the floor 321 by transverse bars 349, 350, and 351 (Fig. 11) and secured to said floor by cap screws 352 is a cover plate 353 (Figs. 10 and 13) having a long shallow notch 354 formed in its inner edge. The plate 353 is provided with a pin 355 near its outer edge (Fig. 10).

Bar 349 (Fig. 11) has a head guide 356 welded thereto. Screwed through a threaded horizontal aperture provided in the opposite end of said bar (Fig. 11) is a stop screw 357 which is held in an adjusted position by a nut 358.

Secured in a vertical hole in the floor 321 by a set screw 365 is a guide pin 366. This pin is received by a transverse groove 367 formed in the bottom face of an extension member 368. The member 368 is wedge shaped, having an inner inclined face 369 and an outer horizontally serrated work gripping face 370. Also shaped from the bottom of member 368 are recesses 375 within the area of which closed vertical slots 376 are provided through which bolts 377 extend upwardly, the heads of these bolts being accommodated by the recesses 375 (Fig. 5). The bolts 377 extend upwardly through tubular flushers 378 and adjustably secure these flushers to the member 368 within the range of movement permitted the bolts 377 in the slots 376. This adjustment is to accommodate flushers 378 to nail chucks 133 so these flushers will lie opposite intervals between the chucks and thus not interfere with the descent of these chucks in nailing.

Figure 11:
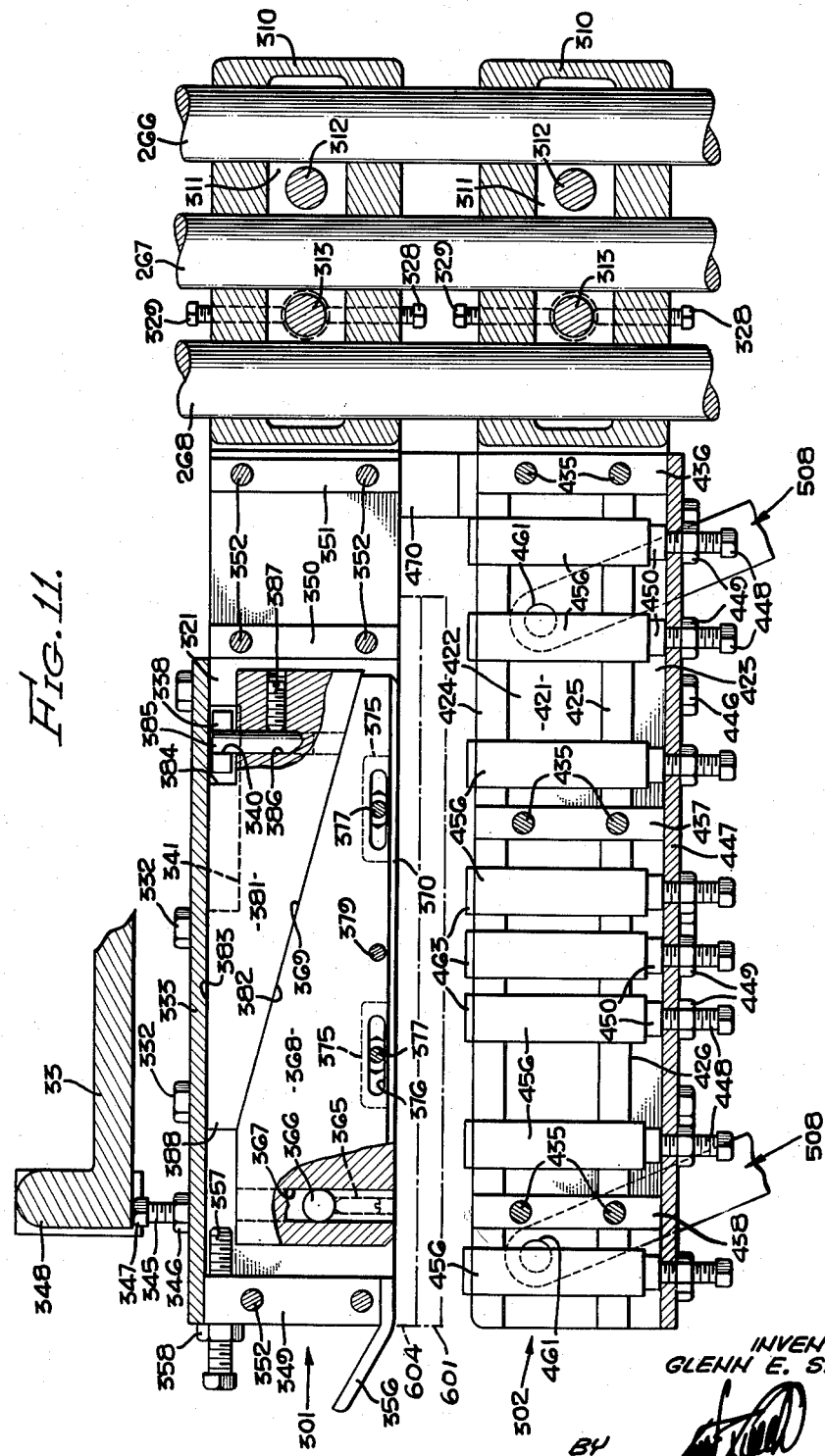
Fig. 11 is an enlarged fragmentary sectional view taken on the line 11—11 of Fig. 5 and illustrating the internal construction of the leftwardmost clamp arm of the invention and the one next thereto.
Figure 12:
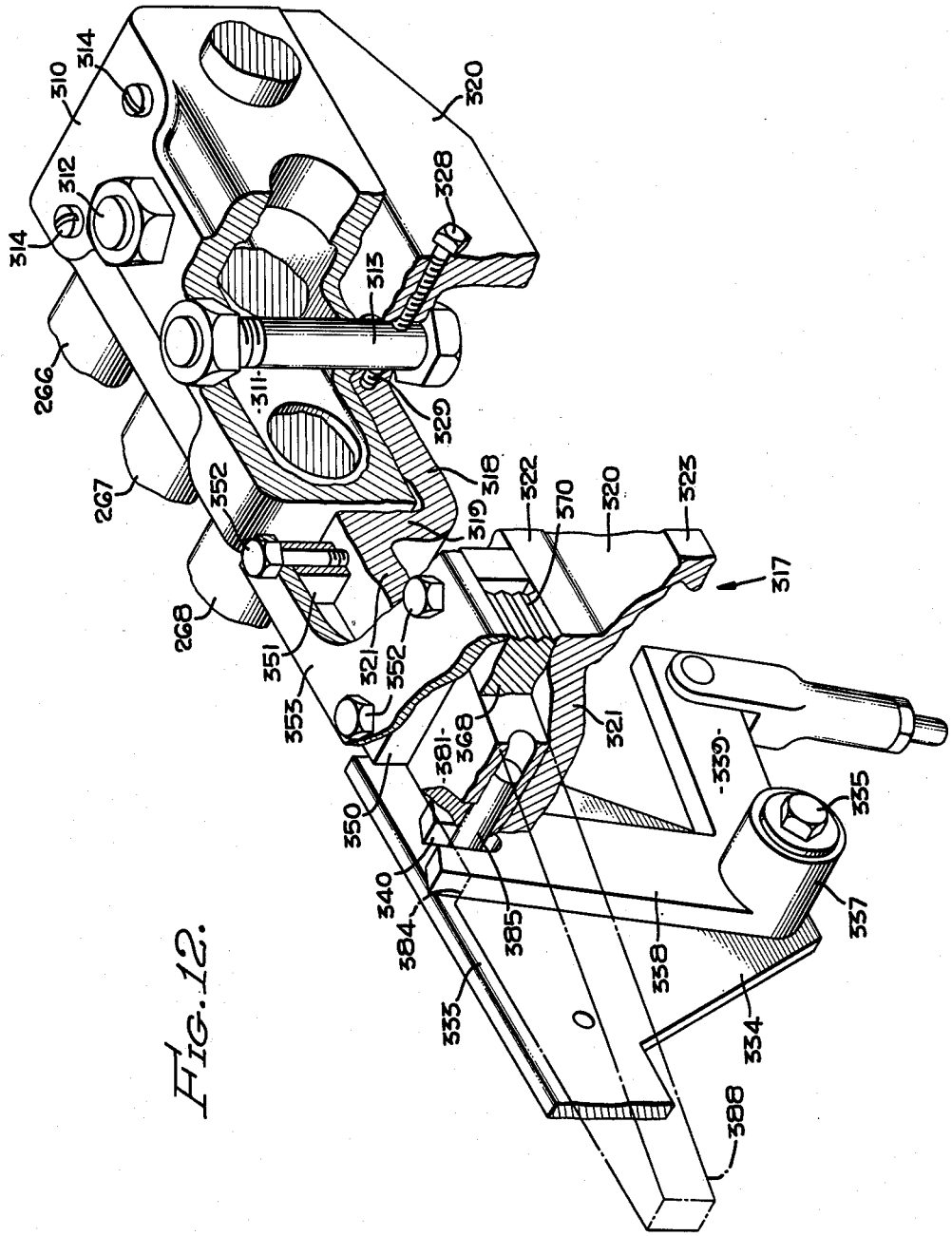
Fig. 12 is a diagrammatic fragmentary perspective view of the leftwardmost clamp arm of the invention and broken away to illustrate the mechanism for actuating the shiftable pressure face extension mounted on said arm.

Also provided on the member 368 in line with the slots 376 is a spring mounting pin 379 which is connected by a spring 380 to the pin 355 (Figs. 10 and 11).

Also mounted between the floor 321 and plate 353 is a wedge member 381 (Fig. 11) having an inclined face 382 which matches and has line to line contact with inclined face 369 of member 368, the back edge 383 of member 381 sliding on the back wall 333. Formed in said back edge is a notch 384 into which the arm 338 extends so that a pin 385, secured horizontally in a hole 386 in member 381, by a set screw 387, is slidably received by the slot 340 of said arm.

The spring 380 constantly acts on the member 368 to withdraw this into the clamp arm 301 and into line to line contact with the member 381 as shown in Fig. 11. The member 381 is operable by rocking the bell crank 337 to shift the member 368 outwardly from the arm 301, the limit of this movement being reached when the narrow end 388 of the member 381 engages the tip of stop screw 357. The member 368 is guided by the pin 366 in the direction of the groove 367 which lies normal to the serrated gripping face 370 of the member 368 which is always parallel with back edge 383 of member 381.

Clamp arm 306, at the opposite end of the machine from clamp arm 301, lacks a jack screw such as the jack screw 345 of arm 301 but otherwise has a structure which is a reverse duplicate of that of arm 301 just described. When referring hereinafter therefore to any part of arm 306 having a corresponding element in arm 301, use will be made of the reference character applied to the latter element, with prime attached.

Actuation of the members 381 and 381' of the clamp arms 301 and 306 to shift members 368 and 368' outwardly and inwardly in the operation of the machine 30, is accomplished by the cam 103 which, as seen in Fig. 5, has lobes 395 and 396 which are spaced by a short dwell 397 and a long dwell 398. Journalling in bearings 58 (Figs. 1 and 5) is a shaft 399 on which is fixed an arm 400 having a cam follower roller 401 which rides on the cam 103 and which is connected by a spring 402 to the spring clip 90 so as to hold roller 401 against said cam. Also fixed to shaft 399 are arms 410 through the apertured ends of which extend rods 411 each of which has collars 412 and 413 (Fig. 5). Coiled about each rod 411 between its collar 412 and arm 410 is an expansive spring 414. The upper ends of rods 411 pivotally connect with the arms 339 and 339' of bell cranks 337 and 337'. It is thus seen that with the rotation of shaft 100, the roller 401, riding onto lobe 395 or 396, swings arm 410 upwardly, rotates bell cranks 337 and 337' and shifts the extension members 368 and 368' of the arms 301 and 306 inwardly towards each other and that each time the roller 401 rides off of one of said lobes into the dwell 397 or 398 spring 402 pulls arm 400 downwardly thereby retracting wedge members 381 and 381' and permitting springs 380 and 380' to retract members 368 and 368' to their retracted positions as shown in Figs. 5 and 11.

Of the remaining clamp arms, arms 302 and 304 are alike and arms 303 and 305 are reverse duplicates of arms 302 and 304. A description of arm 302 will therefore suffice to indicate the structure of all of this group of "inside" clamp arms.

Clamp arm 302 has a body 417 which is a reverse duplicate of body 317 of clamp arm 301 excepting that the floor 421 thereof (Figs. 11 and 13) has recesses 422 and 423 cut therein to provide horizontal slide faces 424 and 425 and a shoulder 426 along the outer edge of face 425. The body 417 includes a left side wall 427 having vertical pressure faces 428 and 429 and a bead 430 opposite the latter face at the lower edge of said side wall (Fig. 13).

Secured by cap screws 435 to the floor 421 and spaced from the latter by blocks 436, 437, and 438 is a cover plate 439. The floor 421 is provided with bosses 445 having tapped holes for receiving cap screws 446 which secure in place a side wall 447. Tapped holes are provided in this wall to receive spring tension adjusting screws 448 having set nuts 449. Spring follower caps 450 are provided on inner ends of the screws 448, these caps extending into bores 455 provided in nail diverting plungers 456 to trap compression springs 457 therein. Each plunger 456 has a lug 458 which limits the response of said plunger to said spring so that the base lines of serrated teeth 463 lie in the vertical plane of vertical faces 428 and 429. Formed on the left side wall 427 of clamp arm 302 and extending under said arm are bosses 459 and lugs 460 which are apertured vertically to receive pivot pins 461, the latter being secured in place by set screws 462.

Inasmuch as the structure of clamp arm 304 is identical to that of clamp arm 302 and the structure of clamp arms 303 and 305 are identical to, although reverse duplicates of, the structure above described of clamp arm 302, subsequent reference to the details of arms 303, 304, and 305 will be by use of the same reference characters which are above employed in described corresponding details of clamp arm 302.

Mounted on the side wall 427 of each of the clamp arms 302, 303, and 305 is a box head stop 470 (Figs. 10, 13 and 15) each of which is in the form of a clamp extending from said wall into the space between this and the next adjacent clamp arm and having a clamp screw 471 which engages the back face of said wall above the bead 430 thereof to hold said stop in place.

Screwed snugly into a threaded aperture provided horizontally in the block 310 of each of clamp arms 302, 304, and 306 is a stop screw 472 (Fig. 10) the purpose of which is to limit the approach of the arms having these screws to the adjacent clamp arms paired respectively therewith, the reason for this being made clear hereinafter.

Figure 17:
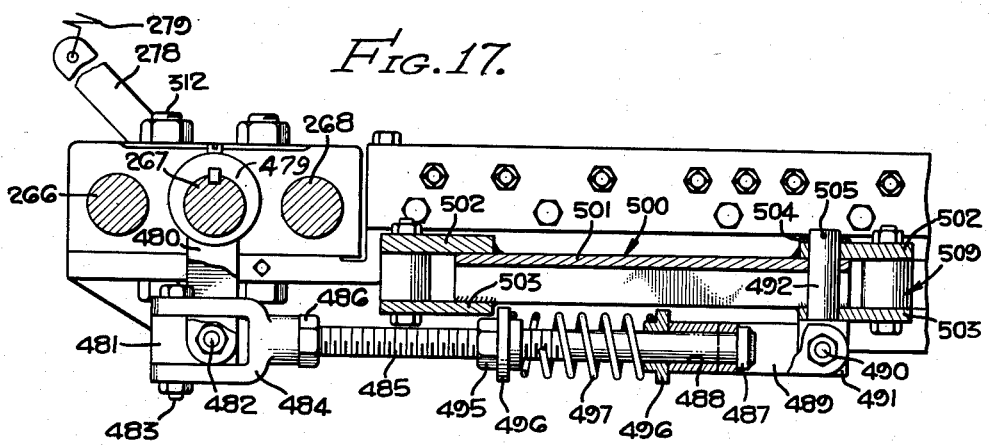
Fig. 17 is an enlarged fragmentary cross-sectional view taken on the line 17—17 of Fig. 10 and illustrates the resilient toggle actuating links and the means for actuating the same.

Mounted on shaft 267 in the space between arms 302 and 303 (Fig. 17) and in the space between arms 304 and 305 (Fig. 10) are collars 479 each of which has a pair of short arms 480, which receives therebetween a swivel block 481, pivotally connected therewith by a bolt 482. Embracing the block 481 and pivotally connected with it by a bolt 483 is a clevis 484 which is tapped to receive a threaded rod 485, the adjusted position of which in said clevis is fixed by a lock nut 486. The rod 485 has a head collar 487 welded on its opposite end and extends through a bore 488 in the crotch of yoke 489, the arms of which receive and are pivotally connected by a bolt 490 to a block 491 having a pin 492 extending upwardly therefrom. Screwed onto the threaded portion of rod 485 is a nut 495. Trapped between said nut and said yoke 489 are spring centering washers 496 and a compression spring 497 (Fig. 17).

Located over each of the assemblies just described is a toggle connector 500 which includes a channel member 501 to opposite ends of which are welded upper and lower plates 502 and 503. These plates at the front end of the connectors 500 are apertured to pivotally receive the pin 492, the upper end of the latter then receiving a washer 504 and a cotter 505 to retain this pin in place. Passing vertically through the plates 502 and 503 at each end of the connector 508 are bolts 506 and 507. Pivotally receiving the bolts 506 (Figs. 10 and 14) and the pins 461 of the clamp arm on the adjacent side of said connector are parallel links 508, which are of fixed length. Pivotally receiving bolts 507 and pins 461 of the clamp arm on the corresponding side of said connector, are parallel turnbuckle links 509 which may be extended or retracted by turning a turnbuckle screw 510 thereof which threadedly connects link heads 511 and 512.

Fixed on the shaft 266 and extending outwardly and upwardly therefrom is a pair of short arms 518 (Figs. 2, 10, and 15). These arms carry inwardly bent stop rods 519 and provide bearings for a shaft 520 on which are fixed hub collars 521 of side piece supporting arms 522, the latter having back stops 523 adjustably fixed thereon. Stop rods 519 are bent over arms 522 (Fig. 10) to limit their upward position in swinging about the axis of shaft 520 to a position in which these are shown in Fig. 15. Extending rearwardly from the nailing table (Fig. 15) is a horizontal bracket 524 which is apertured near its end to receive an actuating rod 525, on the lower end of which is fixed a collar 526 and the upper end of which has a clevis 527, between the arms of which, one of the arms 522 is received and to which said clevis is pivotally connected by a pin 528. Interposed between clevis 527 and bracket 524 is a long coiled compression spring 530. Thus vertical movement of the nailing table 107 actuates the side piece supporting arms 522 through the rod 525 and spring 530.

Pivoted on shaft 520 are collars 535 carrying a cross member 536 on opposite end portions of which arms 537 are welded, these carrying bottom piece backstops 538. Also welded onto cross member 536 is a short actuating arm 539 having an adjustable limit screw 540 which engages the shaft 266 to limit the downward movement of the arms 537. Extending through a suitable hole provided near the inner end of the arm 539 is an actuating rod 541 having a pair of collars 542 and 543 immediately above and below arm 539 and a pair of collars 544 and 545 near its lower end. The lower end of rod 541 extends through an apertured outer end of a bracket 542 which is provided on the nailing table 107 substantially on the same level as the bracket 524 (Fig. 15). The collar 544 is located above the bracket 546 and is engaged by the latter when the nailing table 107 rises to either of its two upper positions so as to lift on the rod 541 and swing the arms 537 and lifting stops 538 upward to inactive positions. This actuation of the stops 538 takes place simultaneously with the lifting of the side supporting arms 522 to their operative positions as shown in this figure.

When the nailing table 107 descends at the conclusion of the initial nailing cycle of a series of three, this lowers the brackets 524 and 546 thereby repositioning the stops 538 and arms 522 as shown in Fig. 16. The arms 522 are thus rendered inoperative and stops 538 are positioned in the horizontal plane in which a bottom part will be inserted into the machine 30 so as to afford gauging stops against which the bottom part may be pushed rearwardly to properly align this with the box heads.

Supported at its opposite ends in the bearing 57 is a heavy shaft 550 having fixed thereto six collars 551 (Figs. 1, 2 and 15) each of which has an eye 552 which is pivotally connected to one end of a turnbuckle 553. These turnbuckles extend forwardly and upwardly, each being located directly beneath one of the clamp arms 301—6 (Fig. 13) and having its upper end pivotally connected to an eye 554 having a short threaded stud 555 which is screwed into a suitable tapped hole provided therefor in the side wall 329 or 320', or 427, as the case may be, of that particular clamp arm. Each of the studs 555 has a lock nut 556 to strengthen the connection between the eye 554 and the body of that clamp arm (Fig. 13).

Referring now to Figs. 3, 10 and 17, a bracket 560 is fixed on the driver frame 162, this bracket having a cam 561 adjustably secured thereto by cap screws 563. Secured as by welding to the lower end of the cam 561 is a wedge cam 564 in the form of a flattened ellipse which provides an elongated slot 565 through which shaft 268 passes so that opposite side portions of the cam 564 lie between the rollers 286 and the bracket 262. Wedge cam 564 has a thin section 566 at its lower end and a thick section 567 at its upper end, these sections being connected by a wedge section 568.

Vertical reciprocation of the nail driver frame 162 (Fig. 3) in a nail driving cycle, lowers the cams 561 and 564 from the positions in which these are shown in Fig. 3 so that the wedge section 568 of cam 564 immediately lifts the rollers 286 onto the high section 567 of said cam thus shifting shaft 268 and clamp arm 306 (Fig. 10) to the left, and compresses spring 288. Following this action, inclined portion 561a of cam 561 engages roller 277 and rotates shaft 267 so as to swing the arms 480 forwardly thereby shifting the toggle connectors 500 forwardly and actuating the toggle arms connected therewith to shift clamp arms 302, 304, and 305 into clamping relation with the other three clamp arms they are paired with. On the return upward of the driver frame 162, cams 561 and 564 rise therewith with a reverse effect to that above described on the shafts 267 and 268, the springs 279 and 288 (Figs. 2 and 10) returning said shafts to normal.

Referring now to Figs. 2, 8, and 10 the aligning and clamping apparatus 260 includes an automatic abutment cam device 575 which is mounted on a base member 576 having flanges 577, 578, and 579 which are provided with holes to receive screws 580, 581, and 582, the holes for the latter two being tapped. The base member 576 fits around the forward edge of side standard 34, and the outwardly extending flange 503 thereof, and is secured in place by screws 580 passing through flange 577 and being received in suitable tapped holes provided in said standard, and by screws 581 in flange 578 being tightened up against the inside crest of the side standard flange 583.

The base member 576 has tapped holes for receiving cap screws 584 which extend through a slot 585 in an abutment block 586 so as to adjustably secure said block to said base member. The screw 582 bears against the outer end of block 586 for making fine adjustments in the position of said block which is maintained by a lock nut 587 on said screw. The inner end of block 586 has an open vertical cam slot 590 the bottom of which is inclined towards arm 306, as shown in Fig. 8. Slidable vertically in the slot 590 is a wedge cam 591 the upper end of which is pivotally secured to a clevis 592 having a stem formed by a bolt 593, which extends downwardly through a vertical hole in a plate 594 secured to the chuck frame 130. Coiled about the stem 593 between the clevis 592 and plate 594 is a coil spring 595. In Fig. 8 the chuck frame 130 is shown in its lowered position at the midpoint in a nailing cycle in which the cam 591 has been lowered in the slot 590 until a wedge section 596 of the cam has engaged the inclined bottom of the cam slot 590 thereby shifting the inner edge 597 of said cam into engagement with the side plate 333' of the clamp arm 306 and halting downward movement of the cam. From the mounting of the stem 593 which is located above the plate 594 in Fig. 8, it will be seen that the cam 591 has become lodged between the block 586 and the clamp arm 306 when the chuck frame 130 was still descending a substantial distance above the lowermost point in its travel. The spring 595 compensates for the relative movement between the chuck frame 130 and the cam 591 while this cam is lodged between the block 586 and the clamp arm 306, which covers the period during which the box heads are clamped by the aligning and compressing mechanism 260.

The device 575 thus transmits to the side frame standard 34 the force of any rightward expansion of clamp arm 306 resulting from outward pressure delivered thereagainst by the clamping operation of the mechanism 260.

The clutch 75 is controlled as by a lug on the master gear 82 or elsewhere on the shaft 80, in a manner well known in the art, to disengage this clutch immediately upon the shaft 80 completing a single revolution. Thus each time the pedal 76 is depressed, the shaft 80 is caused to make a single revolution and halt in its starting position, in which it is shown in Figs. 1, 2, and 3.

*Operation*

The manufacture of a box 600 (Fig. 26) is accomplished by three successive nailing cycles of the machine 30 each of which is initiated by the operator stepping on the pedal 76 and then removing his foot therefrom. Box 600 has end heads 601 and 602 which are identical but assembled with the box in reversed relation to each other. Each of the end heads includes a pair of outside cleats 603 and 604 and a panel 605 which may be and frequently is formed of two pieces 606 and 607. It should also be here noted that the panel pieces 606 and 607 not infrequently vary substantially in thickness, this variation sometimes being as much as ⅛ of an inch because of the low quality of the material used in making up the shook from which the machine 30 is particularly designed to successfully assemble boxes.

Box 600 also includes a center head 610 which comprises a single panel having no cleats although this panel may be formed of two pieces one of which frequently varies in thickness from the other such piece contained in the same head 610. The box 600 also includes two unitary sides 615 and 616 which are nailed at the middle to the center head 610 and along their end edges to the panels 605 with the outer faces of which the end edges of the sides are flush.

It is to be noted that the panels 605 are fairly thin and it is of considerable importance, in order for the machine to manufacture box 600 from a low grade of shook that the side edges of the panels 605 be accurately aligned with the plane in which the nails are to be delivered in nailing the ends of the sides of these panels so that these nails will be delivered precisely in planes parallel with and substantially equidistant from inner and outer faces of the respective end panels 605. The manner in which this is accomplished will be made clear in the description to follow of the making of a box 600 in the machine 30.

The box 600 also has a bottom 620 which is coextensive in length with the box 600 so that its outer edges are flush with the cleats 604 which extend along the lower edges of the end heads 601 and 602. The bottom 620 is also co-extensive in width with the heads 601 and 602 so that it does not overlap the lower edges of the sides 615 and 616.

The shook is fed manually into the machine 30 and manipulated therein as follows: With the machine parts as shown in Figs. 1, 2, 3, and 5, and with the motor 39 running and with all of the chucks 133, from which nails are to be driven in the first nailing cycle, supplied with nails, the operator places end head 601 in the space between arms 301 and 302, end head 602 in the space between clamp arms 305 and 306 and center head 610 in the space between clamp arms 303 and 304. These heads are resting on the anvils 120 on the edges of said heads to which the side 616 will be ultimately nailed. This means that cleats 603 and 604 of the end heads will be disposed vertically, cleats 603 being nearest to the operator. When placed in the machine these heads are shifted manually back against head stops 470 carried on the arms 302, 303, and 305.

The nailing table 107 being in its upwardmost position by virtue of the rollers 116 riding on the cam segments 104 (Figs. 5, 15, and 23) the arms 522 are now in raised position to receive a box side. The operator therefore lays side 615 flat on said arms with its back edge engaging stops 523.

The machine 30 is now prepared for the first nailing cycle which is accomplished by the operator momentarily depressing pedal 76. The resulting single revolution of the shaft 80 operates through the cams 83 (Figs. 1 and 7) and links 128 to reciprocate the chuck frame 130 downwardly and upwardly and through the pitmen 159 and 160 to reciprocate the driver head 162 downwardly and upwardly. The shaft 100 (Figs. 1 and 5) receives a ⅓ revolution from the shaft 80 during each nailing cycle. The conditions which vary in the three successive nailing cycles are produced by the cams on shaft 100. Thus in the first nailing cycle nailing table 107 is in its upwardmost position because the heads 601, 602, and 610 are narrower in width than their height and the first cycle therefore starts as above noted with the nailing table rollers 116 resting on cam segments 104 as shown in Fig. 5. This view also shows this cycle as starting with the roller 401 resting in the dwell 397. The ⅓ revolution given shaft 100 during this cycle lifts roller 401 onto the cam lobe 396 thereby swinging arms 410 upwardly and rotating bell cranks 337 (Fig. 12) and 337' in the clamp arms 301 and 306 (Figs. 10 and 12) thus shifting the gripping face extension members 368 and 368' thereof inwardly into the spaces between the cleats 603 and 604 of heads 601 and 602 distances equal respectively to the thickness of these cleats. These extension members are thus extended irreversibly into positions to engage the outer faces of the upturned side edges of the panels 605 of end heads 601 and 602, as these extensions lie between the cleats 603 and 604 of said heads when said extension members are so extended. The cleated rear and front edge portions of the heads 601 and 602 also lie between clamp arms 301—302 and 305—306 to the front and to the rear of the extensions 368—368'. The clamping action which takes place in this cycle is thus applied equally to the cleated and uncleated portions of the upwardly disposed edges of heads 601 and 602.

With the start downward of the driver frame 162 and chuck frame 130, the cam 564 (Fig. 3) wedges the rollers 286 outwardly shifting shaft 266 to the left (Fig. 10) clamp arm 306 being shifted with this shaft to space said arm from arm 301 for gauging the proper length of box 600. The cam 591 (Figs. 1, 8 and 10) immediately following this, descends into locking relation between the arm 306 and the side standard 34 whereupon the subsequent expansive action of clamp arms 302 and 305 finds outermost clamp arms 301 and 306 buttressed by side frame members 33 and 34 against yielding to this expanding pressure.

The continued descent of the driver head 162 and the cam 561 carried thereon bring this cam into contact with roller 277 (Figs. 3, 10, 18 and 19) to rotate the shaft 267 and actuate the toggle connectors 500 thereby shifting the arm 302 towards the arm 301, arm 304 towards arm 303 and arm 305 towards arm 306, and causing these pairs of arms to compress the heads therebetween along their upwardly disposed edges with a high degree of pressure and with these edges precisely aligned with the vertical planes in which the nail chucks and drivers are mounted to deliver nails downwardly into the work. Just prior to this clamping action taking place, the pads 140 (Figs. 5, 20 and 21) arrived downwardly into contact with the work to depress side 615 against the box heads and press the latter downwardly against the anvils 120 whereby these heads, when gripped between pairs of clamp arms in the mechanism 260, are precisely positioned with relation to each other for the forming of a true box. The clamping action is rapidly followed by the driving of nails from the chucks 133 into the work.

The machine 30 is designed to deliver nails into the work flush with the upper surface of the latter in the planes of the chuck banks 132, even though the vertical depth of the work in those various planes differ substantially. This adjustment of the machine 30 to variations in the depth of the work beneath the different chuck banks 132 is automatically effected by the driver bridge assemblies 167 (Figs. 9, 20, 21, and 22). As indicated in the description of these, each of the driver bridges 193 in each of these assemblies is released from the driver frame 162, on which these assemblies are mounted, immediately upon the drivers 209 having delivered nails downwardly flush with the upper surface of the work disposed immediately beneath that assembly. With the release of each driver bridge in this manner, the downward movement of the drivers carried thereby is halted whereby no overdriving of the nails being driven by these drivers results.

Engagement of the work by the pads 140 so as to depress the box side 615 onto the box heads therebeneath, overcomes the spring 530 and depresses the arms 522 which said spring had held up in the full line position in which they are shown in Fig. 15, to the broken line position shown in that view. This yieldable supporting of said side was to hold it above the end heads 601 and 602 until these are accurately positioned and the side 615 centered with its end edges flush with the end faces of the upturned edges of said end heads, thereby preventing an end edge of said side dropping inside one of said end box heads. The head spacing and side flushing functions are accomplished by the inward shifting of clamp arm 306 by the wedge cam 564 (Figs. 3 and 10) and the inward shifting of the extension members 368 (Figs. 10 and 13) and 368' on arms 301 and 306 which carry flushers 378 and 378'.

The first nailing cycle concludes with the return upward of the nail driver frame 162 and chuck frame 130 and with the cam shaft 100 rotated to a position where the nailing table rollers 116 are brought to rest upon the dwells 106 of cams 102 and the roller 401 has been brought to rest upon the dwell 398 of cam 103. The nailing table 107 is thus lowered to the proper height for supporting the box heads turned 90 degrees for the application thereto of bottom 620. The clamp arms now being relaxed, the work is free enabling the operator to manually rotate this ninety degrees and then push the work backwardly so that the bottom of the box rests against the front ends of arms 302, 303, 304, and 305 thereby properly limiting the work, as to its backward position, for the application of the bottom thereto.

During the second nailing cycle the roller 401 will merely ride on the dwell 398 so that the extensions 368 and 368' (Fig. 10) will remain retracted as shown in Fig. 11 throughout that nailing cycle. This is because the box and heads are now turned (Fig. 24) with their lower cleats 604 (Fig. 26) disposed upwardly and the extensions aforesaid must be retracted to provide room for the clamping of these cleated head edges during the second nailing cycle.

Lowering of the nailing table 107 at the end of the first nailing cycle, lowers the arms 522 and 537 as shown in Fig. 16 thereby depressing the bottom rear edge stops 538 to positions for properly locating the rear edge of the box bottom 620 when this is fed into the machine. In view of the width of the cleated edges of the end heads of the box now disposed upwardly and the substantial distances which the bottom 620 overlies said heads, it is unnecessary to support the bottom, pending the actuation of the clamping mechanism 260, as was the case in respect to box side 615 in preparing for the first nailing cycle. The flushers 378 and 378' (Figs. 5 and 10) on the clamp arms 301 and 306 center the bottom 620 so as to flush its two end edges with the outer faces of the cleats 604 so that the bottom is so related to the box heads when nailed thereto.

The action of the pads 140 in pressing the work downwardly against the anvils 120 in advance of the compressing action of the clamp arms is of especial importance in the second nailing cycle because frequently the side shook used in manufacturing boxes 600 is badly warped so that a warped condition in a first side (after it is nailed to the box heads) tends, when the work is turned in preparation for the second nailing cycle, to hold the end heads in a twisted relation whereby one of these heads is cocked upwardly with relation to the anvil 120 therebeneath and only rests on said anvil at one corner of the head. The pads 140 correct this condition by bringing each cocked head down into true square relation with the other heads and resting snugly against the anvil 120 beneath this head.

Immediately upon the conclusion of the first nailing cycle therefore the operator normally rotates the work ninety degrees between the relaxed pairs of clamp arms, pushes the work back between these until the side 615 engages the front ends of arms 302, 303, 304, and 305 (Fig. 10), inserts bottom 620 into the machine with its rear edge against the stops 538 (positioned as shown in Fig. 16) and with the opposite ends of the bottom resting on the end heads 601 and 602. The operator now kicks the pedal 76 and the machine automatically performs the second nailing cycle in which the same sequence of functions is performed as described for the first cycle with the exception that the extensions 368 and 368' of clamp arms 301 and 306 remain retracted in these arms as shown in Fig. 11 so that inner faces 370 and 370' of these members engage outer faces of cleats 604 (Fig. 26) which in this cycle are disposed upwardly.

The completion of the second cycle ends with the pairs of clamp arms again relaxed to free the work for another quarter turn by the operator which he effects manually thereby bringing the side 615 to rest on the anvils 120 and the bottom 620 of the box vertical and resting against the front ends of clamp arms 302, 303, 304, and 305 (Fig. 10), to limit the rearward movement of the box. The one-third rotation given the shaft 100 during the second nailing cycle brings the cam segments 105 under the rollers 116 as shown in Fig. 25 thus raising the nailing table 107 to a slightly lower level than that shown in (Figs. 15 and 23) but sufficiently high so that the arms 522 will be supported in the positions in which they are shown in full lines in Fig. 15 and arms 537 will be rocked upwardly high enough so that stops 538 will not interfere with introducing box side 616 onto the arms 522 and against the stops 523 (Fig. 15).

The cam segments 105 on which the nailing table 107 is now supported (Fig. 25) have a radius which is less than the radius of the cam segments 104 (Fig. 23) by an amount equal to the thickness of one of the box sides and this is what causes the table 107 to be disposed, at the beginning of the third nailing cycle, below the position in which it is shown in Fig. 15, a distance equal to the thickness of a box side. The reason for this is that during the third nailing cycle side 615 lies between the box heads and the anvils 120 on the nailing table so that the nailing table must be lowered a distance equal to the thickness of this side in order for the upper surface of the work to be approximately at the nailing level.

In the first nailing cycle, with the table 107 in its uppermost position by virtue of its being supported on the cam segments 104, as shown in Fig. 15, it will be noted that the collar 526 is spaced downwardly from the bracket 524 so that in the third nailing cycle when the table 107 is disposed in a position the thickness of a side slat below the position in which it is shown in Fig. 15, expansion of the spring 530 will still operate to support the arms 522 in their uppermost position, as shown in full lines in Fig. 15, in which they engage the stops 519.

Collar 544 is positioned downwardly far enough on the rod 541 so that the arms 537 will be swung upwardly further than necessary to lift the stops 538 out of the way of inserting box side 615 into the machine so that in the third nailing cycle, with the table 107 in a slightly lower position, the stops 538, though at a lower level than shown in Fig. 15, will still be positioned upwardly out of the way of the second box side 616 when this is inserted into the machine.

With the work manually rotated and repositioned as indicated and with the second side 616 inserted in place in the machine against the stops 523 and resting on arms 522, the operator again kicks the foot pedal 76 causing side 616 to be nailed onto the box heads by a series of functions identical to that described for the first nailing cycle. The shifting of the pressure face extension members 368 and 368' inwardly in the third nailing cycle is accomplished by the roller 401 (Fig. 5) riding upwardly onto the lobe 395 of the cam 103 and these members are retracted outwardly when roller 401 drops into dwell 397 as the machine 30 comes to a halt (Fig. 5).

The third nailing cycle concludes with the parts of the machine returned to the positions in which they are shown in Figs. 1, 2, 3, 5, 10, 11, 12, 13, 14, 15, 17, 18, 20, and 23, in readiness to start the first nailing cycle of another box making series of three cycles as soon as the completed box 600 has been removed from the machine which the operator is free to do as the pairs of clamp arms have again relaxed their hold on the heads of said box.

The provision of stop screws 472 (Fig. 10) in certain of the clamp arms is to prevent a collision between nail drivers 209 and any of these arms when the machine 30 is being run empty as is not infrequently done in testing the machine and to operate the nail feed 230 to get in functioning properly before starting to make boxes.

The individual automatic axially adjustable plungers 456 (Fig. 13) on the clamp arms 302, 303, 304, and 305 automatically compensate for variations in the thickness of various portions of a box head being gripped by one of these arms. This function is particularly useful in compensating for variations in the thickness of two slats making up the panel of one of the end heads or constituting the center box head. When such a condition occurs, the plungers 456 opposite the thicker of the two slats will yield further than the plungers opposite the thinner of the slats but all portions of both slats lying within the vertical zone of plungers 456 will be compressed between the clamp arms gripping the same with an adequate pressure to align and support these portions properly when nails are being driven into these.

Because the relative positions of clamp arms 301, 303, and 306 are constant during the driving of nails in each nailing cycle, and because each of arms 302, 304, and 305 is equipped with spring-loaded plungers 456 (Fig. 13), the upper edge portion of each box head, when gripped by a pair of these clamp arms is precisely located with reference to the vertical plane in which nails are driven downwardly from the chuck bank 132 thereabove so that said plane will be parallel with and substantially equidistant from opposite faces of the material into which the nails are to be driven. There is thus a minimum tendency of these nails to form shiners, a term applied to a nail which comes out of the head along the side face thereof. The horizontally serrated character of the gripping faces of members 368 and 368' (Figs. 5 and 13) and plungers 456, which compress the box heads in the areas immediately opposite the points at which nails are driven downwardly into these heads, has the effect of deflecting back into a head any nail turning outwardly from the material thereof, thereby preventing said nail forming a shiner, or at least a shiner, the point of which extends out into the box.

The force with which it is necessary to grip the box heads between the clamp arms 301—6 in order to perform the functions above described, results in these arms supporting the upper portions of the box heads by their gripping action so that it is not necessary to depend upon the capacity of the heads to resist compression in the planes of the heads for supporting the upper portions of the heads in the horizontal plane in which it is necessary for these to receive nails in order to form a true box. The support thus given the box heads by the clamp arms 301—6 is made possible by the support of these arms from beneath by the turnbuckle links 553.

The claims are:

1. In a nailing machine for making boxes, the combination of: a main frame having a work supporting anvil; a chuck frame carrying nail chucks; a driver frame carrying nail drivers, said frames being parallel with each other, said drivers slidably penetrating said chucks; mechanism on said main frame for producing relative vertical movement between said chuck and driver frames and said anvil to drive nails into work supported on said anvil to nail side and bottom parts of a box onto the heads thereof; pairs of clamp arms supported on said main frame the arms of each pair being initially spaced apart to freely receive one of the heads of said box; means actuated by said mechanism at the beginning of a nailing cycle to produce relative movement between the two endmost clamp arms disposed outside opposite ends of the work whereby said two arms establish the proper overall length of said box and are temporarily fixed against movement apart; and means responsive to said mechanism just before the driving of the nails into the work during a given nailing cycle to cause the clamp arms of each pair thereof to close tightly on the box head therebetween without substantially disturbing the spacing with respect to each other of said endmost clamp arms.

2. A combination as in claim 1 in which a pair of spring loaded pads are provided on said chuck frame in the line of chucks over each of the box heads, said pads extending below said chucks to engage the work just prior to the closing of the pairs of clamp arms as aforesaid, thereby pressing the work including the box heads thereof downwardly against said anvil whereby the parts of said work will be in their true relationship when said clamp arms close on said heads and the nails are thereafter driven into the work.

3. A combination as in claim 2 in which said endmost clamp arms carry vertical flushers for positioning a side or bottom part with its end edges flush vertically with the outer faces of the edges of the end heads of said box onto which said side or bottom part is to be nailed in the nailing cycle in which said flushing takes place.

4. A combination as in claim 3 adapted for use in making a box the end heads of which have outside cleats along certain edges thereof and lack said cleats along other edges thereof, said combination including inwardly shiftable extensions of the pressure faces of said endmost clamp arms; and means responsive to said mechanism for shifting said extensions inwardly distances equal to the thicknesses of said cleats during the initial portion of each nailing cycle in which edges of said end heads having no cleats are disposed upwardly for receiving the nails in said nailing cycle, said means fixing said extensions against withdrawal during the clamping action of said arms in each such cycle.

5. A combination as in claim 4 in which said end flushers are mounted upon said endmost clamp arm extensions.

6. A combination as in claim 1 in which said main frame is provided with heavy side frame members; and means on said side frame members for supporting said clamp arms at their rear ends, one of said endmost clamp arms being stationary and the other endmost clamp arm being shiftable towards the first clamp arm in order to establish the length of a box; means between the front end of the first endmost clamp arm and the adjacent side frame member for supporting said endmost clamp arm against outward pressure; and a wedge cam controlled by said mechanism to be interposed between the other frame side member and the front end of the other endmost clamp arm after the latter has been shifted inwardly as aforesaid, whereby said frame side members are directly associated with the front ends of said endmost clamp arms to prevent expansion of the latter under the expensive pressure applied thereto in the clamping of said heads just prior to the driving of the nails in each nailing cycle, said mechanism removing said wedge cam from blocking relation with said second endmost clamp arm and the adjacent frame side member, at the conclusion of each nailing cycle, thereby permitting expansion between said endmost clamp members and the releasing of the work whereby this may be removed from the machine or turned in preparation for the next succeeding nailing cycle.

7. A combination as in claim 1 in which at least one clamp arm of each of the pairs thereof is provided with a series of individually spring loaded nail diverting plungers disposed with their axes lying across the arm and having horizontally serrated gripping faces which extend outwardly beyond the pressure face of said clamp arm, one of said plungers being located to embrace a portion of each head gripped thereby into which portion a nail is driven while said head is so gripped.

8. A combination as in claim 1 which is adapted for the making of a box having two end heads and a center head and therefore employing three pairs of clamp arms, one of the endmost clamp arms and the adjacent one of the center pair of clamp arms being fixed in rigid spaced relation and the other of said endmost clamp arms being shiftable relative to the first endmost clamp arm in order to properly space said endmost clamp arms for establishing the true length of the box being manufactured.

9. A combination as in claim 1 which is adapted for the making of a box having two end heads and a center head and therefore employing three pairs of clamp arms, the individual clamp arms of which may be identified consecutively from one side of said machine as 1, 2, 3, 4, 5, and 6; clamp arms 1 and 3 being mounted in rigidly spaced relation and clamp arm 6 being shiftable towards clamp arm 1 to effect a spacing therebetween for establishing the length of a box to be manufactured, clamp arms 2, 4, and 5 being freely slidable horizontally relative respectively to clamp arms 1, 3, and 6, the means for operating said pairs of clamp arms to cause them to close tightly on the box heads therebetween including a connector member parallel with and between clamp arms 2 and 3, parallel pairs of toggle arms connecting said member with clamp arms 2 and 3; a connector member parallel with and lying between clamp arms 4 and 5, parallel toggle arms pivotally connected at their opposite ends to said second member and to clamp arms 4 and 5, and means for shifting said connector members to shift clamp arm 2 away from clamp arm 3 and to shift clamp arms 4 and 5 apart.

10. A combination as in claim 1 adapted for use in making a box the end heads of which have outside cleats along certain edges thereof and lack said cleats along other edges thereof, said combination including inwardly shiftable extensions of the pressure faces of said endmost clamp arms; means responsive to said mechanism for shifting said extensions inwardly distances equal to the thicknesses of said cleats during the initial portion of each nailing cycle in which edges of said end heads having no cleats are disposed upwardly for receiving the nails in said nailing cycle said means fixing said extensions against withdrawal during the clamping action of said arms in each such cycle.

11. A combination as in claim 1 adapted for use in making a box the end heads of which have outside cleats along certain edges thereof and lack said cleats along other edges thereof, said combination including inwardly shiftable extensions of the pressure faces of said outside clamp arms; means responsive to said mechanism for shifting said extensions inwardly distances equal to the thicknesses of said cleats during the initial portion of each nailing cycle in which edges of said end heads having no cleats are disposed upwardly for receiving the nails in said nailing cycle, said means fixing said extensions against withdrawal during the clamping action of said arms in each such cycle; a pair of arms shiftably mounted between a position in which they support a box part horizontally at a level above the upper edges of the box heads resting on said anvil, and a lowered position in which said arms are out of the way; and means responsive to said mechanism for shifting said arms to their upper position at the conclusion of a given cycle and yieldably supporting them therein during the initial portion of a subsequent nailing cycle.

12. A combination as in claim 1 adapted for use in making a box, the end heads of which have outside cleats along certain edges thereof and lack said cleats along other edges thereof, said combination including inwardly shiftable extensions of the pressure faces of said outside clamp arms; means responsive to said mechanism for shifting said extensions inwardly distances equal to the thicknesses of said cleats during the initial portion of each nailing cycle in which edges of said end heads having no cleats are disposed upwardly for receiving the nails in said nailing cycle said means fixing said extensions against withdrawal during the clamping action of said arms in each such cycle; a pair of arms shiftably mounted between a position in which they support a box part horizontally at a level above the upper edges of the box heads resting on said anvil and a lowered position in which said arms are out of the way; means responsive to said mechanism for shifting said arms to their upper position at the conclusion of a given cycle, and yieldably supporting them therein during the initial portion of a subsequent nailing cycle; and a pair of vertical flushers carried on each of said shiftable extensions, flush with the pressure faces thereof, and extending upwardly therefrom for engaging and flushing ends of said box part, resting on said support arms, with outer faces of the upper edges of said end heads.

13. In a nailing machine the combination of: a main frame; a work supporting anvil provided on said frame; a chuck frame; nail chucks carried on said chuck frame; a driver frame; a driver bridge frame mounted at its opposite ends on said driver frame; a driver bridge mounted on said driver bridge frame for a limited degree of vertical movement relative thereto; nail drivers carried on said driver bridge; a pair of releasable hold down devices on said driver bridge frame at opposite ends thereof designed to hold said driver bridge downwardly on said driver bridge frame; mechanism on said main frame for producing relative vertical movement between said chuck and driver frames and said anvil to drive nails into work supported on said anvil; and means extending downwardly below said chucks and engaged by the work before the work engages said chucks in a nailing cycle, and adapted, when so engaged, to actuate said hold down devices whereby the latter release opposite ends of said driver bridge substantially freeing said nail drivers from downward pressure imposed thereon through said driver bridge and driver bridge frame by said driver frame.

14. In a nailing machine, the combination of: a main frame; a work supporting anvil on said frame; a chuck frame; a bank of nail chucks mounted on said chuck frame; a driver frame; a driver bridge supported at its opposite ends on said driver frame; a series of nail drivers, one for each of said chucks, said drivers being mounted on said driver bridge and extending downwardly therefrom and into said chucks; a pair of releasable hold down devices on said driver frame adjacent opposite ends of said driver bridge said devices normally holding said driver bridge downwardly so that the nail driving movement is imparted from said driver frame through said hold down devices and said driver bridge to said drivers; mechanism on said main frame for producing relative vertical movement between said chuck and driver frames and said anvil to drive nails into work supported on said anvil; and release means positioned to extend below the lower ends of said nail chucks adjacent opposite ends of said bank of chucks and to be engaged by the work in advance of said work engaging said chucks whereby relative movement is caused between said means and said driver frame effecting the release of said hold down devices and the freeing of said driver bridge from said driver frame to relax said driving pressure on said drivers approximating at the moment when said drivers have driven nails flush with the surface of the work.

15. In a nailing machine for making boxes, the combination of: a main frame having a work supporting anvil; a nailing mechanism supported on said frame above and in spaced relation with said anvil; power means on said main frame for producing relative vertical movement between said nailing mechanism and said anvil to cause said nailing mechanism to nail side and bottom parts of a box onto the heads thereof; two pairs of clamp arms provided on said main frame, the arms of each pair being initially spaced apart to freely receive one of the end heads of said box; means actuated by said power means at the beginning of a nailing cycle to shift one of the two endmost clamp arms toward the other of said endmost clamp arms whereby said two endmost arms establish the proper over-all length of said box; and means responsive to said power means before the driving of the nails into the work during said nailing cycle to shift the other clamp arms of said two pairs of arms toward said endmost clamp arms to cause said pairs of clamp arms to close tightly on the box heads disposed respectively therebetween without substantially disturbing the spacing with respect to each other of said endmost clamp arms.

16. A combination as in claim 15 in which substantial portions of the main frame are disposed outwardly respectively from and adjacent to said endmost clamp arms; means for supporting one of said endmost clamp arms by the main frame portion adjacent thereto against outward movement of said clamp arm, the other endmost clamp arm being shiftable as aforesaid; and means responsive to the operation of said power means in a given nailing cycle to establish support of the shiftable endmost clamp arm by the main frame portion adjacent thereto against outward movement of said clamp arm from the position to which it was inwardly shifted, and to maintain said support of said shiftable endmost clamp arm pending the completion of the nailing operation taking place during said nailing cycle.

17. A combination as in claim 16 in which said pairs of clamp arms are located close to the upper edges of said box heads and in which at least one of the clamp arms of each of said pairs thereof is provided with a serrated gripping face whereby the clamping of said heads between said pairs of clamp arms provides a very substantial degree of resistance against slippage of said heads downwardly between said clamp arms, thereby materially supplementing the resistance to compression inherent in said heads in their resistance to the vertical pressure applied to said heads incidental to said nail driving operation.

18. In a nailing machine for making boxes, the combination of: a main frame having a work supporting anvil; a nailing mechanism supported on said frame above and in spaced relation with said anvil; power means on said main frame for producing relative vertical movement between said nailing mechanism and said anvil to cause said nailing mechanism to nail side and bottom parts of a box onto the heads thereof; two pairs of clamp arms provided on said main frame, the arms of each pair being initially spaced apart to freely receive one of the end heads of said box; setting means actuated by said power means at the beginning of an ailing cycle to shift one of the two endmost clamp arms toward the other of said arms whereby said two endmost arms establish the proper over-all length of said box; and clamping means subsequently responsive to said power means before the driving of the nails into the work during said nailing cycle to shift the other clamp arms of said two pairs of arms toward said endmost clamp arms to cause said pairs of clamp arms to close tightly on the box heads disposed respectively therebetween without substantially disturbing the spacing with respect to each other of said endmost clamp arms.

19. A combination as in claim 18 in which said nailing machine is adapted for the manufacture of a box having a center head, and which machine is provided with a central pair of clamp arms for clamping and positioning said center head during each nailing cycle in the manufacture of said box; and expanding mechanisms disposed on opposite sides of said central pair of clamp arms and each of which mechanisms is operative, when actuated, to separate the clamp arm of said central pair which is adjacent thereto from the adjacent clamp arm of the other pair of clamp arms adjacent to said mechanisms, said clamping means aforesaid simultaneously actuating said expanding mechanisms to cause the end heads and center head of said box to be tightly gripped by said three pairs of clamp arms in proper positions for assembly with said box.

20. A combination as in claim 19 in which each of said expanding mechanisms comprises a multiple toggle including a central bar disposed between and in parallel relation with the two clamp arms operated by said mechanism, and at least two pairs of toggle links, inner ends of which are pivoted to said bar and outer ends of which are pivoted respectively to said clamp arms, corresponding links of said pairs being parallel, said links being shiftable approximately to dead center relation when said mechanisms are actuated as aforesaid.

GLENN E. STILWELL.

No references cited.